US011625775B2

(12) United States Patent
Frazer

(10) Patent No.: US 11,625,775 B2
(45) Date of Patent: Apr. 11, 2023

(54) SYSTEM FOR COLLECTING WEEKLY PAYMENTS FROM A CUSTOMER, HOLDING THOSE WEEKLY PAYMENTS IN ESCROW, AND THEN MAKING MONTHLY LOAN PAYMENTS TOWARD THE CUSTOMER'S AUTO LOAN USING THE ESCROWED PAYMENTS

(71) Applicant: Frazer IP LLC, Deerfield Beach, FL (US)

(72) Inventor: Michael S. Frazer, Marco Island, FL (US)

(73) Assignee: Frazer IP LLC, Deerfield Beach, FL (US)

( * ) Notice: Subject to any disclaimer, the term of this patent is extended or adjusted under 35 U.S.C. 154(b) by 0 days.

(21) Appl. No.: 16/990,873

(22) Filed: Aug. 11, 2020

(65) Prior Publication Data
US 2021/0049686 A1 Feb. 18, 2021

Related U.S. Application Data

(60) Provisional application No. 62/885,650, filed on Aug. 12, 2019.

(51) Int. Cl.
*G06Q 40/03* (2023.01)
*G06Q 20/32* (2012.01)
(Continued)

(52) U.S. Cl.
CPC ............ *G06Q 40/03* (2023.01); *G06Q 20/24* (2013.01); *G06Q 20/3223* (2013.01); *G06Q 30/0201* (2013.01); *G06Q 30/0278* (2013.01)

(58) Field of Classification Search
CPC ..................................................... G06Q 20/24
(Continued)

(56) References Cited

U.S. PATENT DOCUMENTS

2006/0074795 A1* 4/2006 Maharaj ................. G06Q 40/03
705/38
2008/0015954 A1* 1/2008 Huber .................... G06Q 30/06
705/28

(Continued)

FOREIGN PATENT DOCUMENTS

WO WO-2005013043 A2 * 2/2005 ............. G06Q 20/10

OTHER PUBLICATIONS

Mortgage banking: Internet and integration are key; IEEE Periodical Publication; Authors: M. Stanford [+details];Publication Date: Mar. 1, 2002 Published in: IT Professional (vol. 4, Issue: 2, pp. 47-52) (Year: 2002).*

(Continued)

*Primary Examiner* — Bruce I Ebersman
*Assistant Examiner* — Hatem M Ali
(74) *Attorney, Agent, or Firm* — Crowe & Dunlevy; Jeremy B. Berman

(57) ABSTRACT

The Advantage2U® system is an on-line system that increases the buying power of customers, enables customers to pay down a vehicle loan more quickly than the standard payments for the loan term would allow, and enables customers with negative equity in a vehicle loan to more quickly reach a position of positive equity. The Advantage2U system accomplishes this by collecting weekly payments from customers, instead of monthly payments from the customers. Since vehicle loans require monthly payments, the Advantage2U system collects one quarter of the total monthly payment per week. However, since this results in the customer paying one quarter of the monthly payment for 52 weeks in a given year, instead of the customer making 12 monthly payments, the customer has effectively made 13 monthly payments in a given year, and (Continued)

the extra amounts paid are directly applied to the principal of the loan.

10 Claims, 38 Drawing Sheets

(51) Int. Cl.
    *G06Q 20/24*         (2012.01)
    *G06Q 30/0201*     (2023.01)
    *G06Q 30/02*         (2023.01)

(58) Field of Classification Search
    USPC .......................................................... 705/38
    See application file for complete search history.

(56) References Cited

U.S. PATENT DOCUMENTS

| | | | | |
|---|---|---|---|---|
| 2008/0228643 | A1* | 9/2008 | Hall | G06Q 30/02 705/40 |
| 2011/0213699 | A1* | 9/2011 | Johnson | G06Q 40/02 705/39 |
| 2020/0127843 | A1* | 4/2020 | Webster | H04L 63/102 |

OTHER PUBLICATIONS

Electronic Financial Markets; Published in: MIT Press 1999; Authors: J Christopher Westland • Theordore H. Clark. (Year: 1999).*

Interbank Transfers—Balance Build—Transfer & Account Management;https://ip.com/IPCOM/00024593 ip.com Disclosure No. IPCOM000245937D Publication Date: Apr. 18, 2016 (Year: 2016).*

Publication title: Newstex Finance & Accounting Blogs: Publication year: 2018; Author: Jean Folger; Document URL: https://dialog.proquest.com/professional/docview/2135153353?accountid=131444 (Year: 2018).*

Mortgage banking: Internet and integration are key; IEEE Periodical Publication; Authors: M. Stanford [+details]; Publication Date: Mar. 1, 2002 Published in: IT Professional (vol. 4. Issue: 2. pp. 47-52) (Year: 2002) (Year: 2002).*

Electronic Financial Markets; Published in: MIT Press 1999; Authors: J Christooher Westland * Theordore H. Clark. 2002 Published in: IT Professional (vol. 4. Issue: 2. pp. 47-52) (Year: 2002) (Year: 1999) (Year: 2002).*

Interbank Transfers—Balance Build—Transfer & Account Management;https://ip.com/IPCOM/00024593 ip.com Disclosure No. IPCOM000245937D Publication Date: Apr. 18, 2016 (Year: 2016) (Year: 2016).*

Mortgage banking: Internet and integration are key; IEEE Periodical Publication; Authors: M. Stanford [+details]; Publication Date: Mar. 1, 2002 Published in: IT Professional (vol. 4. Issue: 2. pp. 47-52) (Year: 2002) (Year: 2002) (Year: 2002).*

Electronic Financial Markets; Published in: MIT Press 1999; Authors: J Christooher Westland * Theordore H. Clark. 2002 Published in: IT Professional (vol. 4. Issue: 2. pp. 47-52) (Year: 1999) (Year: 2002) (Year: 2002) (Year: 2002).*

* cited by examiner

FIG. 4

Value Option Details About Your 2004 Chevrolet Colorado

Help your Vehicle Seller's Agent™ get a better idea of your vehicle's valuable features by reviewing and selecting all the applicable features your vehicle has. Some of the items below are not standard to all 2004 Chevrolet Colorados and you will have to add them yourself.

- Roll Bar
- LS Package
- Missing Auto. Trans.
- Missing Power Windows-LS
- Winch
- Missing Power Door Locks-LS

- 4 Cyl. Engine
- Snow Plow Package/Plow
- Towing/Camper Package
- Missing Cruise Control
- Fiberglass Cap Once you are comfortable with the Selected Value Options, click the submit button to save and go back to your vehicle's MAX Allowance® Completion Hub.

Save & Return to Hub

Advantage2U

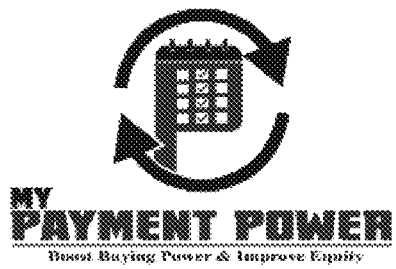

Calculate purchasing power

The Test Dealer car calculator shows you how to afford more vehicle & build equity faster with less loan interest!

Monthly Payment $100.00                                                     $2,000.00

Learn more about adding 2 extra payments a year to help your monthly budget and improve your equity and debt to income ratios:
https://advantage2u.com/weekly-vehicle-loan-payment-calculator.html

* Summary: For a small $2.98 per transaction convenience fee, The Advantage2U™ plan is adding a 13th payment to your annual number of payments, and splitting your monthly payment into 52 (easier to budget) weekly payments annually. You'll eliminate late fees & be paying an extra $9.53 every week to pay off your loan in 60 months instead of the typical 72 months. This also saves approximately $419.83 in loan interest in the process!

FIG. 26

Advantage2U

Let's match your budget to our available inventory!

Calculate purchasing power

The Ewald Kia car calculator lets you shop vehicles and a protection package that matches your ideal weekly budget.

Use the sliders below to dial in the price range for your vehicle search. When finished, hit the search button to see all of the vehicles we have which qualify.

| | | |
|---|---|---|
| Monthly Payments | $100.00 ————————————— $500.00 | $2,000.00 |
| Down Payment | $0.00 ————————————————————— $500.00 | $2,000.00 |
| Loan Length | 48 mo ——————————————————————— 72 mo | 84 mo |

*Avg Interest Rate Based On Selected Term
*Subject to credit score verification & rate approval

Monthly Payments

| | |
|---|---|
| Monthly Payment: | $500.00 |
| Purchasing Power: | $25,000.00 |
| Term Reduction: | 6 Months |
| Contracted Term | 72 Months |
| Effective Term | 72 Months |
| Payment Benefit Accelerated by | $0.00 |
| Interest Charges Reduced by | $0.00 |

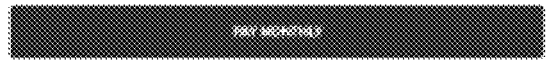

Weekly Payments

| | |
|---|---|
| Monthly Payment: | $125.00 |
| Purchasing Power: | $25,000.00 |
| Term Reduction: | 12 Months |
| Contracted Term | 72 Months |
| Effective Term | 60 Months |
| Payment Benefit Accelerated by | $5,000.00 |
| Interest Charges Reduced by | $412.00 |

FIG. 33

SYSTEM FOR COLLECTING WEEKLY PAYMENTS FROM A CUSTOMER, HOLDING THOSE WEEKLY PAYMENTS IN ESCROW, AND THEN MAKING MONTHLY LOAN PAYMENTS TOWARD THE CUSTOMER'S AUTO LOAN USING THE ESCROWED PAYMENTS

PRIORITY CLAIM

This application claims priority to U.S. Provisional Patent Application No. 62/885,650, filed Aug. 12, 2019, the contents of which are incorporated by reference in their entirety to the maximum extent allowable under the law.

RELATED APPLICATION

This application is also related to co-pending U.S. application Ser. No. 16/990,844, filed on Aug. 11, 2020, entitled "SYSTEM FOR ENABLING AUTO DEALERS TO PROVIDE INFORMED OFFERS FOR THE PURCHASES OF USED VEHICLES FROM POTENTIAL CUSTOMERS", which also claims priority to U.S. Provisional Patent Application No. 62/885,650, filed Aug. 12, 2019, the contents of which are hereby incorporated by reference.

TECHNICAL FIELD

This application is directed to their field of on-line automotive sales. In particular, this application is directed to an on-line system that connects potential consumers seeking to sell or trade-in an automobile with auto dealers seeking to purchase used automobiles. By utilizing the "retail-down" approach of the disclosed on-line system, the auto dealers are able to formulate an informed offer for the customers' automobiles that will serve to entice the customers receiving said offer to contact the auto dealers by being higher than offers generated using the common "wholesale-up" approach, while also giving the auto dealers confidence that they will be able to earn a desired amount of profit upon resale of the automobiles they purchase using the on-line system disclosed herein. Moreover, the on-line system is so arranged such that, depending on how the customer has entered into the on-line system, multiple auto dealers may provide offers to a single customer, enhancing the customer's confidence that the offers they have received are fair offers, thereby helping to further entice the customers to contact the auto dealers that provided them with the offers.

BACKGROUND

Conventionally, when an individual desires to sell their vehicle, they are required to visit an auto dealer. At the auto dealer, an appraiser will inspect the vehicle in order to determine the aesthetic and mechanical condition of the vehicle. From the results of this inspection, the auto dealer will consult a source such as Kelley Blue Book, NADA, Black Book, Edmunds, etc., in order to determine the wholesale value of the vehicle given its make/model, year, and condition. Beginning from this wholesale value, the auto dealer estimates how much they need add to the wholesale value in order to reach a deal with the individual, and provides the resulting sum to the individual.

Using this "wholesale up" method for generating an offer to the customer for their used vehicle, the offers typically end up being lower than necessary in order for the auto dealer to be able to earn their desired and necessary profit, which in turn may result in the customer leaving and the potential for a deal being lost.

The Internet has enabled potential customers to locate and contact auto dealers to obtain an offer on their used vehicle without physically traveling to the dealers. However, due to the wholesale up method of determining offers, combined with the fact that auto dealers lack the information they would have about the vehicle if the vehicle was presented to them in person, the resulting offers are typically sufficiently low that they disappoint the potential customers, resulting in the potential customers not traveling to the dealers and the potential for a deal being lost.

Therefore, using current systems, it is questionable whether such Internet based offers to potential customers for their used vehicles even help drive sales. To the contrary, such systems may actually depress sales, harming the auto dealers employing them, and perhaps even incorrectly convincing potential customers that they cannot afford the new vehicle that they desire.

Since customers are ever more desirous of conducting transactions partly or entirely online, particularly at the time of the filing of this Application, a great need has arisen for an on-line system that acts as a conversion tool designed to facilitate offers that actually lead to a deal being made by and between an auto dealer and a customer, said deal being fair and equitable to both auto dealer and customer.

Moreover, due to the change in the market conditions relating to how auto dealers formerly purchased used vehicles to offer for re-sale on their lots, particularly at the time of the filing of this Application, a great need has arisen for an on-line system that facilitates the sourcing of used vehicles by auto dealers for re-sale on their lots while bypassing the traditional channels therefor.

As such, there is a commercial need for development into these areas. The Applicant of this disclosure has developed a system that addresses these needs and more, as will be set forth in detail below.

There is more to a potential customer and an auto dealer reaching a deal and a sale being conducted, naturally. In the US vehicle market, over 85% of new vehicle purchases are financed and are not cash deals. Traditional financing arrangements enable the buyer to borrow the requisite funds to purchase the vehicle in exchange for agreeing to pay interest to the financing institution, and then require the buyer to make monthly payments (for example, 36, 48, 60, or 72 monthly payments) to repay the principal of the loan borrowed to purchase the vehicle as well as the agreed upon interest.

Regarding typical vehicle loans in the US vehicle market, average interest rates range from 3.6% to 15%+, and the average monthly payment for a new vehicle purchase is $531, while the average monthly payment for a used vehicle purchase is $381. In addition, nearly 75% of new vehicle loans are for a term of greater than 61 months, and nearly 58% of used vehicle loans are also for a term of greater than 61 months. This structure is disadvantageous to both the buyer and the seller. Due to the inherent difficulty in budgeting one's expenses, buyers often have difficulty making one large payment per month, leading to reduced buying power for buyers, and reduced sales revenue for auto dealers. Therefore, commercial development of systems which enable purchasers of vehicles to make their loan payments, and even enhance the purchasing power of vehicle purchasers so that they can afford more expensive vehicles, would be beneficial to both vehicle buyers and auto dealers. The Applicant of this disclosure has developed a system that also addresses these needs and more, as will also be set forth in detail below.

SUMMARY

Disclosed herein is the Max Allowance® system, a detailed online conversion tool existing as instructions executed by a server and designed to bring potential customers (whether they be seeking to buy, sell, or trade) together with auto dealers over the Internet. The core of the system lies in the prompting of the potential customer for a great amount of detail about the vehicle they wish to sell or trade, including approximately thirty photos taken via smartphone, a walk-around video of the vehicle taken via smartphone, how much (if any) the potential customer still owes to a lender for the vehicle, how much the potential customer would like to receive for the vehicle they wish to sell or trade, and self-disclosed details about the interior/exterior/mechanical condition of the vehicle that explain issues that may not be apparent from the photos and walk-around video.

From this level of detail about the vehicle, which the auto dealer would otherwise require physical possession of the vehicle in order to know, the Max Allowance® system is able to formulate an offer for the vehicle using a "retail down" pricing system described herein, taking into account an estimated retail sales price for the vehicle taking into account costs to the dealer such as reconditioning, transportation (if the vehicle is not local to the dealer), expected duration of time the vehicle will take for the dealer to re-sell, and the amount of profit the dealer desires to make off the re-sell of the vehicle. This offer will end up being higher than an offer formulated by an auto dealer using conventional Internet or in-person based "wholesale up" pricing systems, thereby enticing the potential customer to pursue the deal with the auto dealer, while at the same time, leaving the auto dealer with reasonable assurances that the deal will be sufficiently profitable for them. Thus, the Max Allowance® system enables an auto dealer to conduct and close a greater number of deals.

There are three ways in which a potential customer may become engaged with the Max Allowance® system:

1. The user happens to visit the website of a specific auto dealer that utilizes the Max Allowance® system, and clicks on a link to begin the entry of their information into the system. When a user is engaged with the system in this fashion, since the user engaged the system through the website of that specific dealer, the user receives an offer for the vehicle they wish to sell or trade only from that dealer.

2. An auto dealer itself, seeking to bolster used vehicle inventory, uses the Max Allowance® system to auto-contact owners of desired vehicles, for example by extracting the contact info of those owners from the for-sale section of online classified sites such as Craigslist® and Facebook®, and then sending a SMS or e-mail message to those owners containing a link to the Max Allowance® system. Those owners may in turn engage with the Max Allowance® system and receive an offer from the auto dealer that entices them to further engage the auto dealer and potentially reach a deal.

3. The potential customer directs the web browser on their computer, tablet, or smartphone to the Max Allowance® system. The potential customer in turn engages with the Max Allowance® system, and receives offers from multiple different auto dealers, giving the customer confidence that the offers they are receiving are fair, and enticing the customer to engage with one of the auto dealers and potentially reach a deal.

Although the above has focused on the vehicle sale or trade-in aspect of the Max Allowance® system, the system also allows the potential customer to input information about a type of vehicle they would to purchase, thereby allowing auto dealers to tailor their offers and messages to the potential customer based thereupon.

These, and numerous other aspects and advantages of the Max Allowance® system will be described in detail below.

Also disclosed herein is the Advantage2U® system, My Payment Power purchasing system, which increases the buying power of customers purchasing vehicles, enables customers to pay down a vehicle loan more quickly than the standard payments for the loan term would allow, and enables customers who have negative equity in a vehicle loan to more quickly pay off the negative equity and reach a position of positive equity. The Advantage2U® system accomplishes this by collecting weekly payments from customers, instead of monthly payments from the customers. Since vehicle loans require monthly payments, the Advantage2U® system collects one quarter of the total monthly payment per week. However, since this results in the customer paying one quarter of the monthly payment for 52 weeks in a given year, instead of the customer making 12 monthly payments, the customer has effectively made 13 monthly payments in a given year, and under common vehicle loans, the extra amounts paid would be directly applied to the principal of the loan. By paying extra toward the principal of the loan, the loan is paid off in less time than the total loan term would indicate, and the amount owed on the loan at most points during the loan is therefore less than the expected amortized amount at that point. Consequently, the buying power of a customer using the Advantage2U® system to make their auto loan payments is enhanced, as they are able to more quickly pay down loan amounts, and more quickly build positive equity in their vehicles. This enables a customer using the Advantage2U® system to, for example, purchase a more expensive vehicle than they would otherwise feel comfortable purchasing, thereby increasing customer satisfaction, as well as increasing auto dealer and auto manufacturer profit.

BRIEF DESCRIPTION OF THE DRAWINGS

FIG. 4 shows a prompt by the Max Allowance® system to a potential customer requesting contact information for the potential customer.

FIG. 5 shows a prompt by the Max Allowance® system to a potential customer requesting information about options possessed by the vehicle they wish to sell.

FIG. 7 shows a prompt by the Max Allowance® system to a potential customer requesting information about the interior of the vehicle they wish to sell.

FIG. 8 shows a prompt by the Max Allowance® system to a potential customer requesting information about the exterior of the vehicle they wish to sell.

FIG. 9 shows a prompt by the Max Allowance® system to a potential customer requesting financial information pertaining to the vehicle as well as the potential customer's future vehicular purchase plans.

FIG. 10 shows a dashboard presented by the Max Allowance® system to a potential customer showing what information they have completed entering about the vehicle, as well as showing messages that have been exchanged with a dealer.

FIG. 11 shows an offer screen presented by the Max Allowance® system to a potential customer.

FIG. 15 illustrates a dashboard shown to a dealer using the Max Allowance® system, illustrating vehicles that have been entered into the Max Allowance® system by potential customers.

FIG. 17 shows a detailed vehicle information screen presented by the Max Allowance® system to a dealer.

FIG. 18 shows a communications dashboard screen presented by the Max Allowance® system to a dealer.

FIG. 20 shows a communications dashboard screen presented by the Max Allowance® system to a dealer, in which the dealer clicked on the message category drop down menu.

FIG. 22 shows a dashboard screen presented by the Max Allowance® system to a dealer, in which the dealer can generate custom categories and custom messages.

FIG. 23 is a diagram illustrating the financial advantages provided to a dealer by the Max Allowance® system.

FIG. 25 illustrates a sample dealer website from which a customer may engage the Advantage2U® system.

FIGS. 26-29 illustrate steps of data input by a potential customer when engaging the Advantage2U® system.

FIG. 33 is a payment calculator displayed to a user by the Advantage2U® system that the user can use to match their budget to available inventory of an auto dealer from which they have engaged the Advantage2U® system.

DETAILED DESCRIPTION

First, the hardware upon which the Max Allowance® system summarized above will be described in detail, and thereafter, the Max Allowance® system itself will be described in detail.

Figure 1:
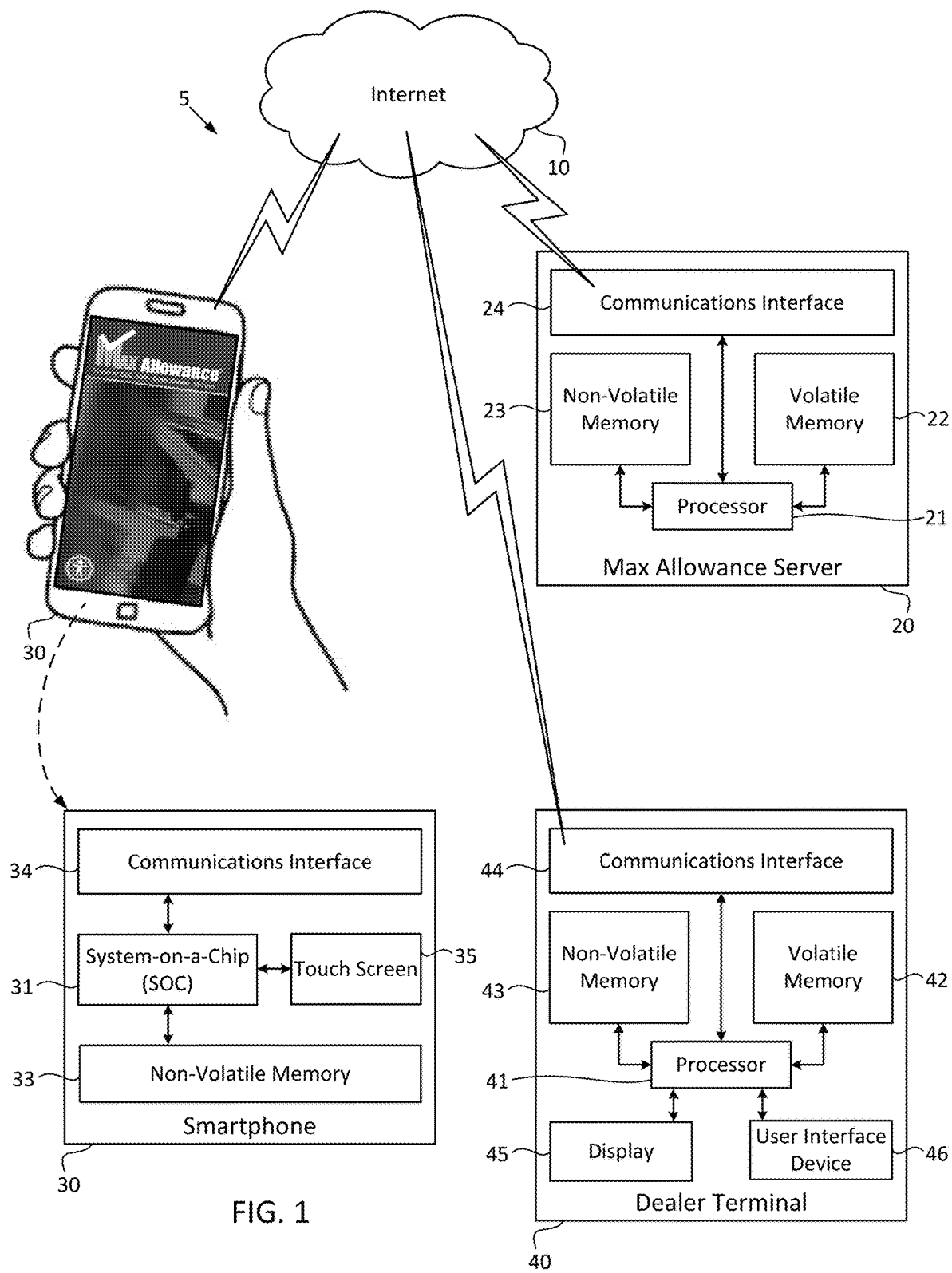
FIG. 1 is a block diagram showing the hardware on which the Max Allowance® system described herein operates.

The hardware system 5 is illustrated in FIG. 1, where it can be seen that four main components are involved, namely the Max Allowance® system server 20, a user device 30, a dealer terminal 40, and the Internet 10 facilitating data communication between the Max Allowance® system server 20, user device 30, and the dealer terminal 40.

The Max Allowance® server 20 includes a processor 21 cooperating with a volatile memory 22 (e.g., RAM) and a non-volatile memory 23 (e.g., a hard drive) to execute the functions of the Max Allowance® system that will be described below. A communications interface 24 (e.g., ethernet interface) of the server 20 facilitates communications, over the internet 10, to the user device 30 and dealer terminal 40.

The user device 30 is illustratively shown as a smartphone, but may also be a tablet or personal computer, and includes a system-on-a-chip (SOC) 31 that cooperates with a non-volatile memory 33 (e.g., solid state memory), and through the communications interface 34 and over the Internet 10 communicates with the Max Allowance® server for interfacing and using the Max Allowance® system either via the web or via an application executed by the SOC 31. The SOC 31 interfaces with a touch screen display 35 to facilitate customer interaction with the Max Allowance® system. Note that the SOC 31, as commonly utilized in smartphones and tablets, includes both a processor and volatile memory. As such, understand that interactions below described as happening between the user of the device 30 and the Max Allowance® system involve a display of information to the user on the device 30, the acceptance of user input to the device 30, and the transmission of the user input to the server 20 over the Internet 10.

The dealer terminal 40 may be a device such as a desktop or laptop computer, and includes a processor 41 that cooperates with a volatile memory 42 (e.g., RAM), a non-volatile memory 23 (e.g., a hard drive), and that, through the communications interface 44 and over the Internet 10, communicates with the Max Allowance® server for interfacing and using the Max Allowance® system. The processor 41 interfaces with a display 45 and user interface 46

(e.g., keyboard and mouse) to facilitate dealer interaction with the Max Allowance® system. As such, understand that interactions below described as happening between the dealer and the Max Allowance® system involve a display of information to a user at the dealer on the dealer terminal 40, the acceptance of user input to the dealer terminal 40, and the transmission of the user input to the server 20 over the Internet 10.

Figure 2:
FIG. 2 shows the landing page of the Max Allowance® system as displayed to a potential customer requesting the state and market in which the potential customer desires to sell their vehicle.
Figure 3:
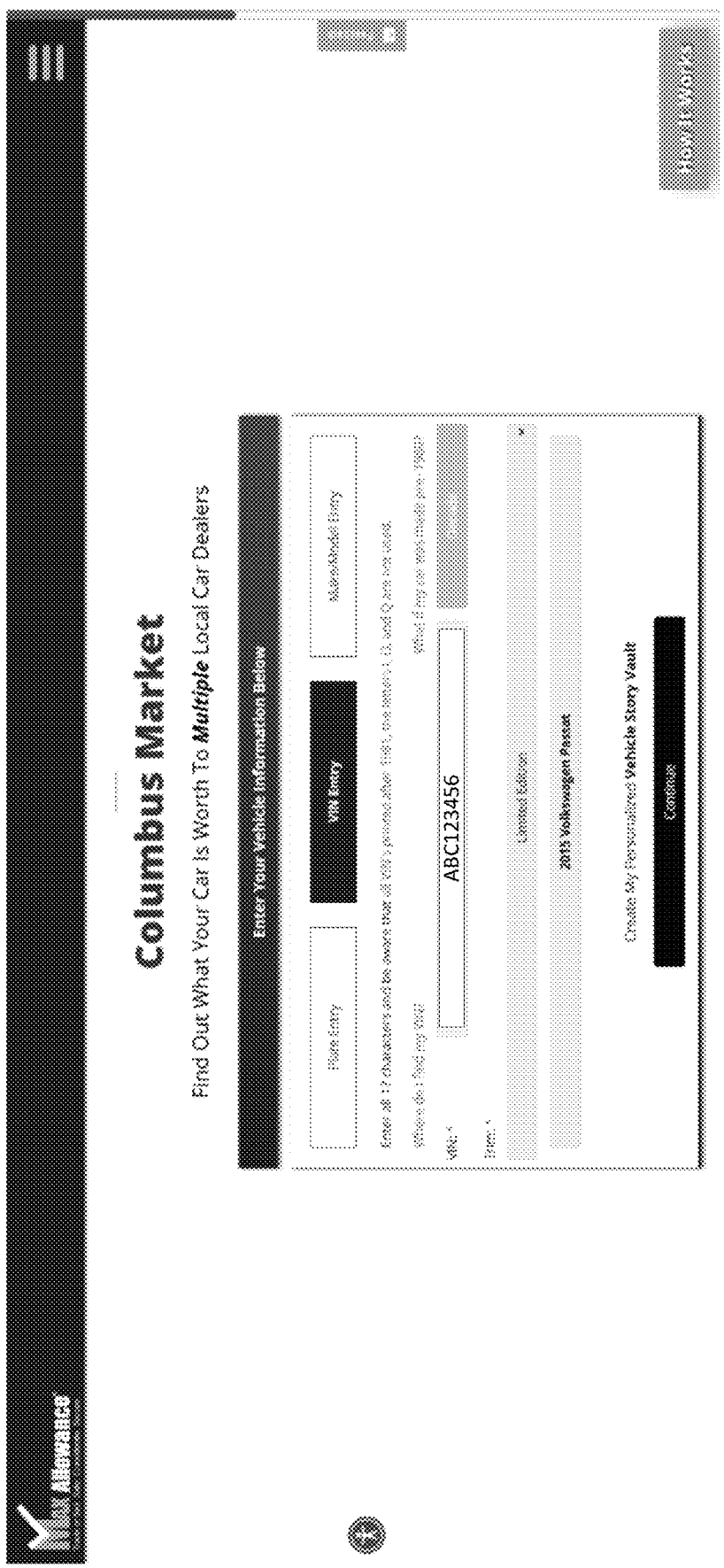
FIG. 3 shows a prompt by the Max Allowance® system to a potential customer requesting the VIN of the vehicle they desire to sell.

Shown in FIG. 2 is the landing or "home" page for the Max Allowance® system viewed by a potential customer on their device 30 when they initially connect to the Max Allowance® system running on the Max Allowance® server 20 over the Internet 10. In addition to offering the potential the opportunity to view a video explaining the Max Allowance® system, the landing page asks the potential customer to enter the state and market (e.g., city, metro area, county, etc) in which they are seeking to sell their vehicle. Once the potential customer has entered the requested info, they are next prompted to enter information about their vehicle, such as the vehicle identification number (VIN), make/model, and license plate number, as shown in FIG. 3.

Figure 4:
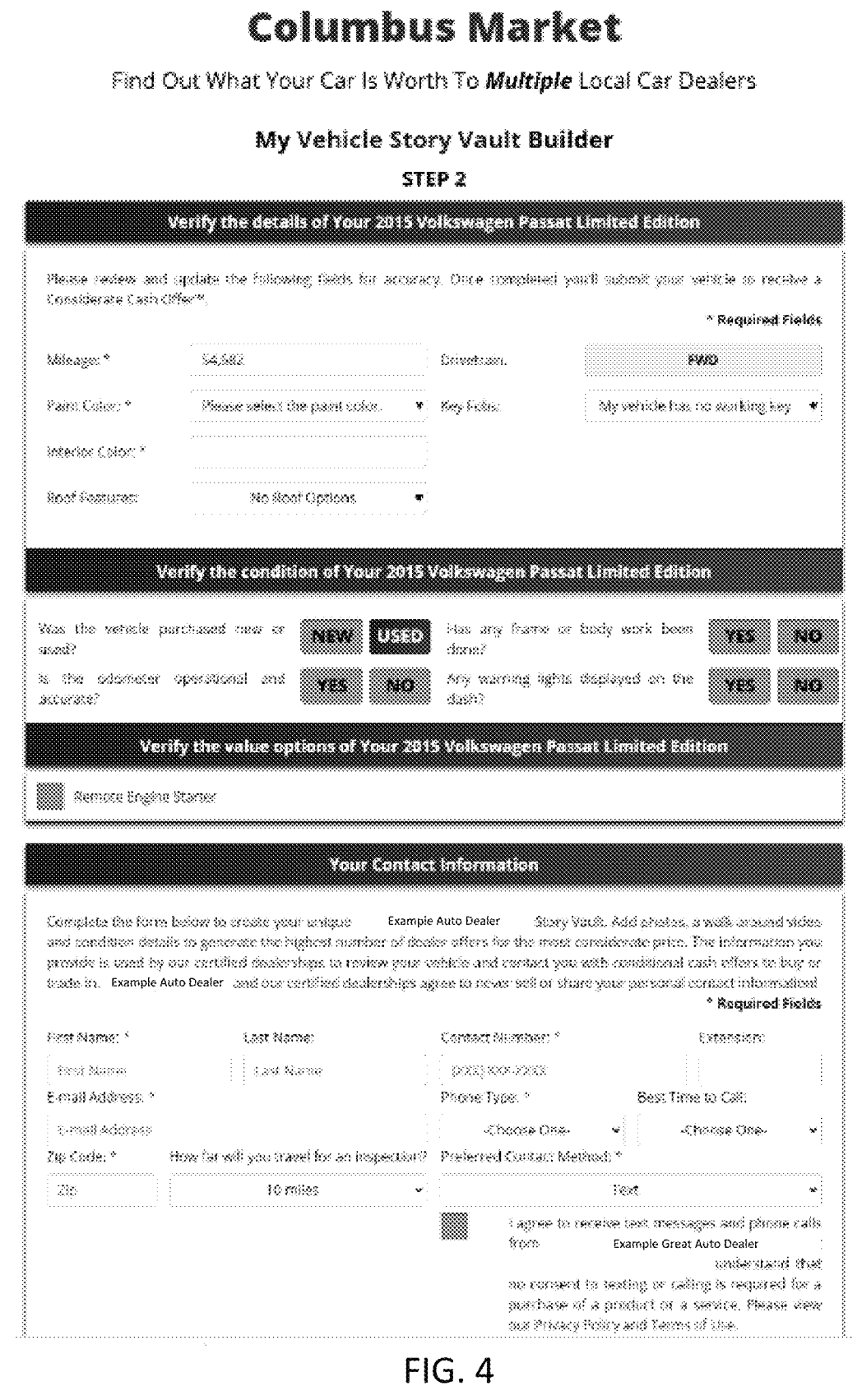

Once this information has been entered, the potential customer proceeds to a Vehicle Story Vault Builder page, where the potential customer is prompted to enter more specifications and information about their vehicle, such as its mileage, paint color, interior, roof features (e.g., sunroof, targa top, convertible, etc.), drivetrain (e.g., front wheel drive, rear wheel drive, all-wheel drive, four wheel drive, etc.), and how many key fobs the potential customer possesses for the vehicle, as shown in FIG. 4. Here, the potential customer is also prompted to enter specifics such as whether they are the first owner of the vehicle, whether the vehicle's odometer is operational and accurate, whether any repairs to the vehicle's body or frame have been performed, and whether any warning lights (e.g., check engine, check tire pressure, low oil, etc) are displayed on the dashboard. Also, the potential customer may be prompted to verify whether certain value added options (options that increase the value of the vehicle to a prospective buyer) are present, such as a remote engine starter. The Max Allowance® system may decode the VIN to decide which value added options to inquire about, as such information is often encoded within the VIN. The user may also be prompted to fill in and/or verify additional value added options on another screen, such as that shown in FIG. 5. Referring back to FIG. 4, the potential customer is requested to enter their contact information, preferred time and mode of contact, as well as how far the potential customer is willing to drive to sell or trade their vehicle.

Figure 6:
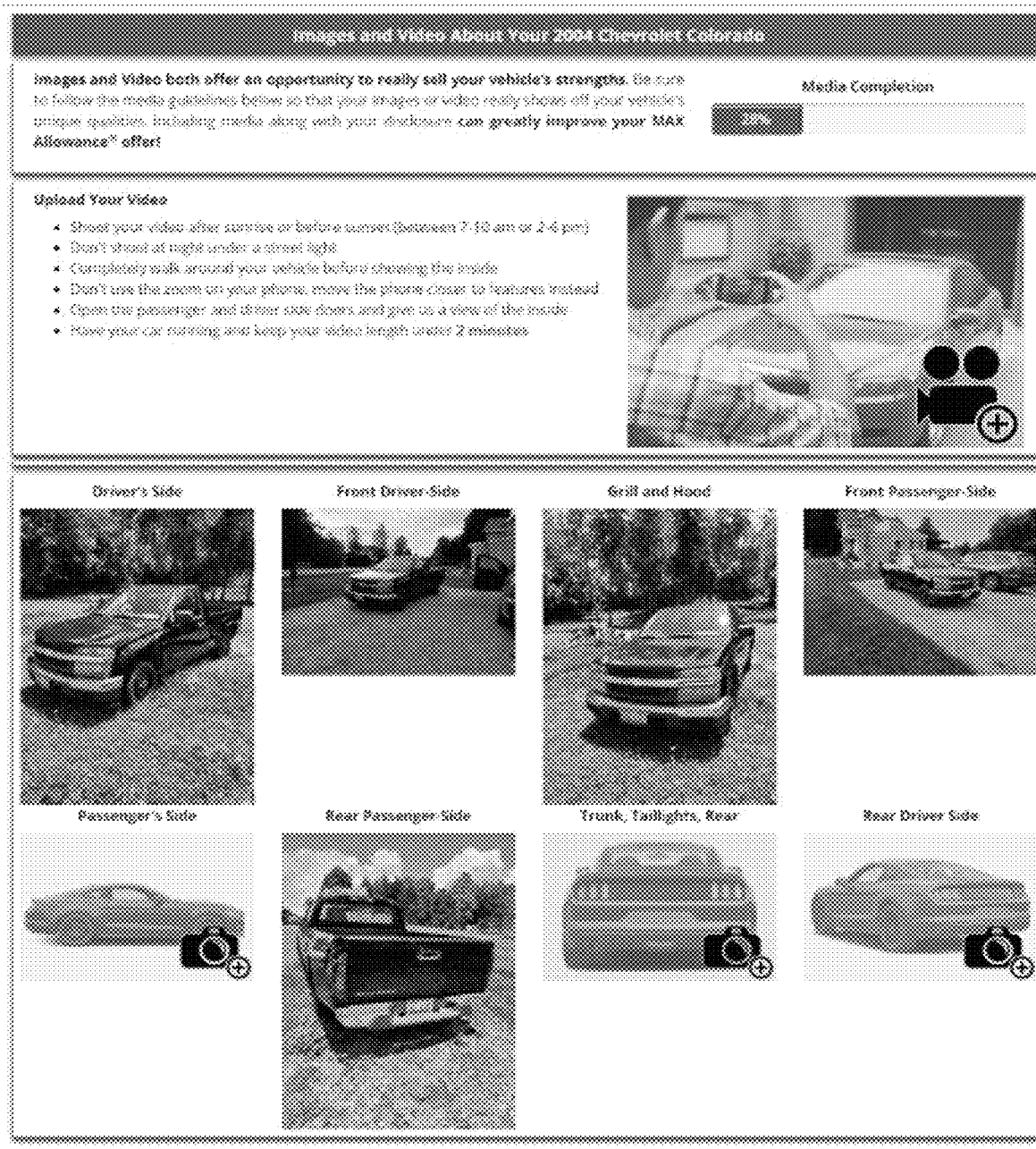
FIG. 6 shows a prompt by the Max Allowance® system to a potential customer requesting the potential customer to upload images and a walk-around video of the vehicle they wish to sell.

The potential customer may then be prompted to upload images and video of the vehicle they wish to sell, as shown in FIG. 6. Here, the potential customer is prompted for images of the vehicle from different angles, and before the potential customer has submitted a given image, a sample image of a vehicle taken from the desired angle is displayed to the potential user so that there is no confusion about the angle at which each image should be taken. In addition, the potential customer here is prompted to upload a walk-around video of the vehicle, and is given specific instructions on how to take said video. The uploading of images and video of the vehicle is particularly easy for the potential customer to accomplish when the user device 30 is a smartphone, as such devices typically possess cameras capable of taking images and video at sufficient quality levels to accurately represent the looks and condition of the vehicle.

Figure 7:
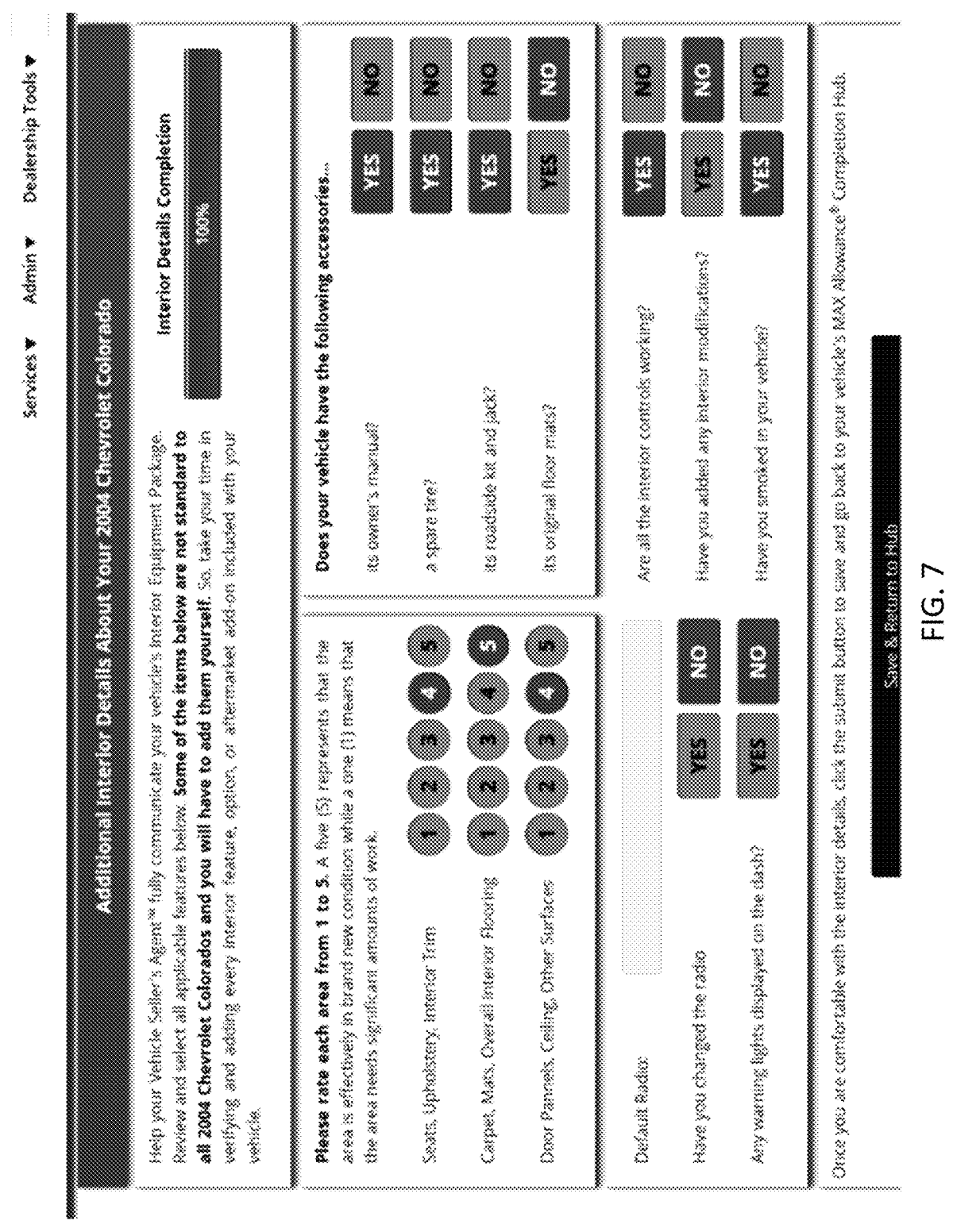

The potential customer may also be prompted to provide details about the interior of the vehicle, the contents thereof, and the working of functions therein, as shown in FIG. 7. For example, the user may be requested to rate the condition of the seats/upholstery/interior trim, carpet/maps/interior flooring, and door panels/ceiling/other surfaces on a scale of 1 to 5. In addition, the potential customer may be asked whether the vehicle has an owner's manual, spare tire, roadside kit/jack, and its original floor mats. The potential customer may also be asked what radio is in the vehicle, whether the radio has been changed to an aftermarket unit, whether any warning lights are on in the dash, whether all interior controls work, whether the interior has been modified, and whether the vehicle has been smoked in. Dependent upon the potential customer's answers to these questions, the potential customer may be asked for additional information—for example, if the potential customer indicates that all interior controls are not working, the potential customer may be asked which interior controls are not working (e.g., turn signals, map light, power window control switches, etc).

Figure 8:
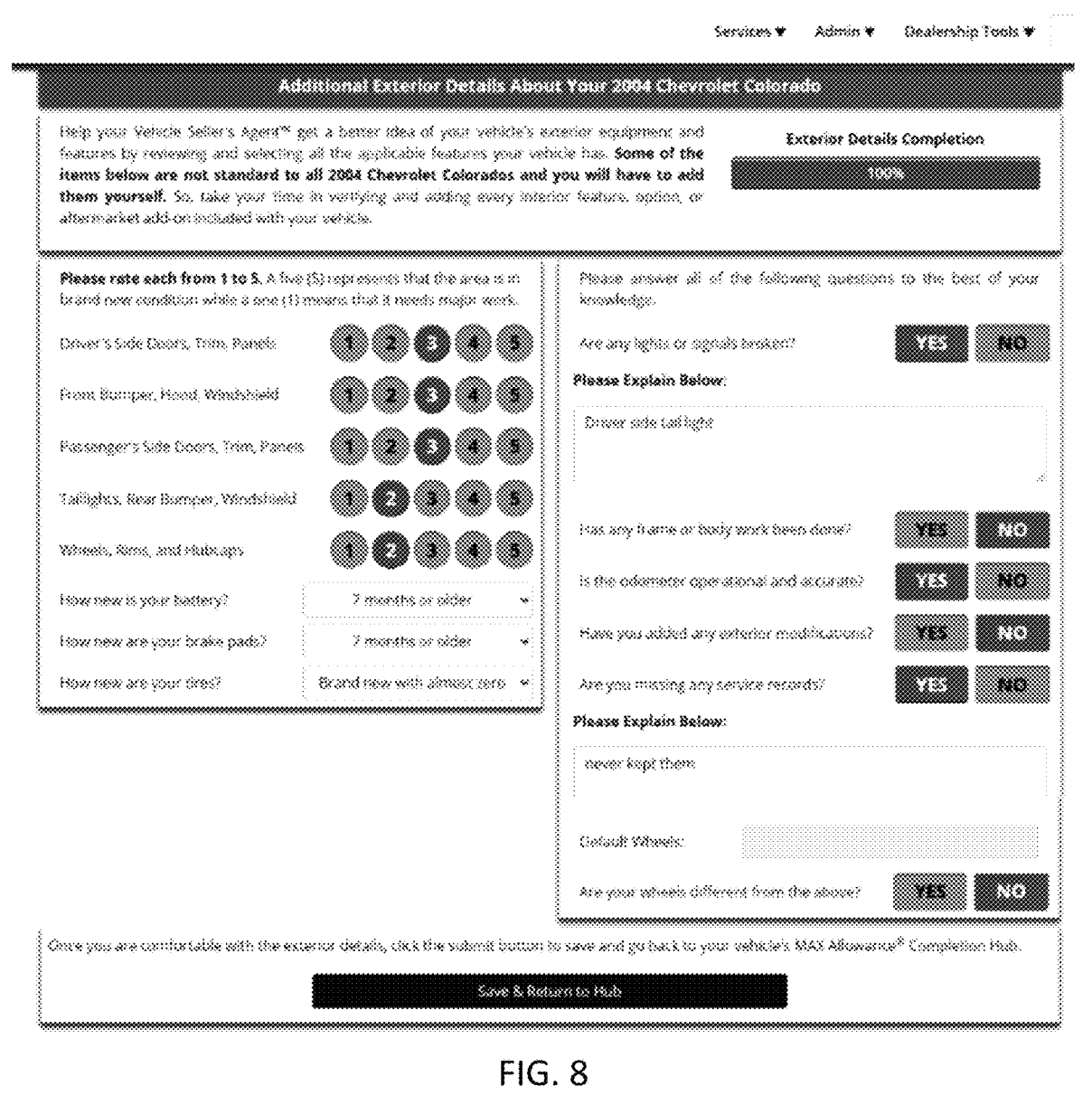

The potential customer may also be prompted to enter details about the exterior of the vehicle, as well as about the vehicle's battery, brake pads, tires, and odometer, as shown in FIG. 8. For example, the potential customer may be requested to rate the condition of the driver's side doors/trim/panels, front bumper/hood/windshield, passenger's side doors/trim/panels, taillights/rear bumper/windshield, and wheels/rims/hubcaps on a scale of 1 to 5. In addition, the potential customer may be asked the age of the vehicle's battery and brake pads, as well as the condition of the vehicle's tires. Still further, the potential customer may be asked whether any lights or signals are broken, whether any frame or body work has been done to the vehicle, whether the odometer is operational and accurate, whether any exterior modifications have been added, whether service records are present or missing, what wheels the vehicle has, and whether the potential customer has changed the vehicle's wheels. Dependent upon the potential customer's answers to these questions, the potential customer may be asked for additional information—for example, as shown, if the potential customer indicates they are missing service records, they may be provided with a text box in which they can explain why the service records are missing, and in the illustrated example, the potential customer has indicated that the service records are missing because they did not keep said service records.

Figure 9:
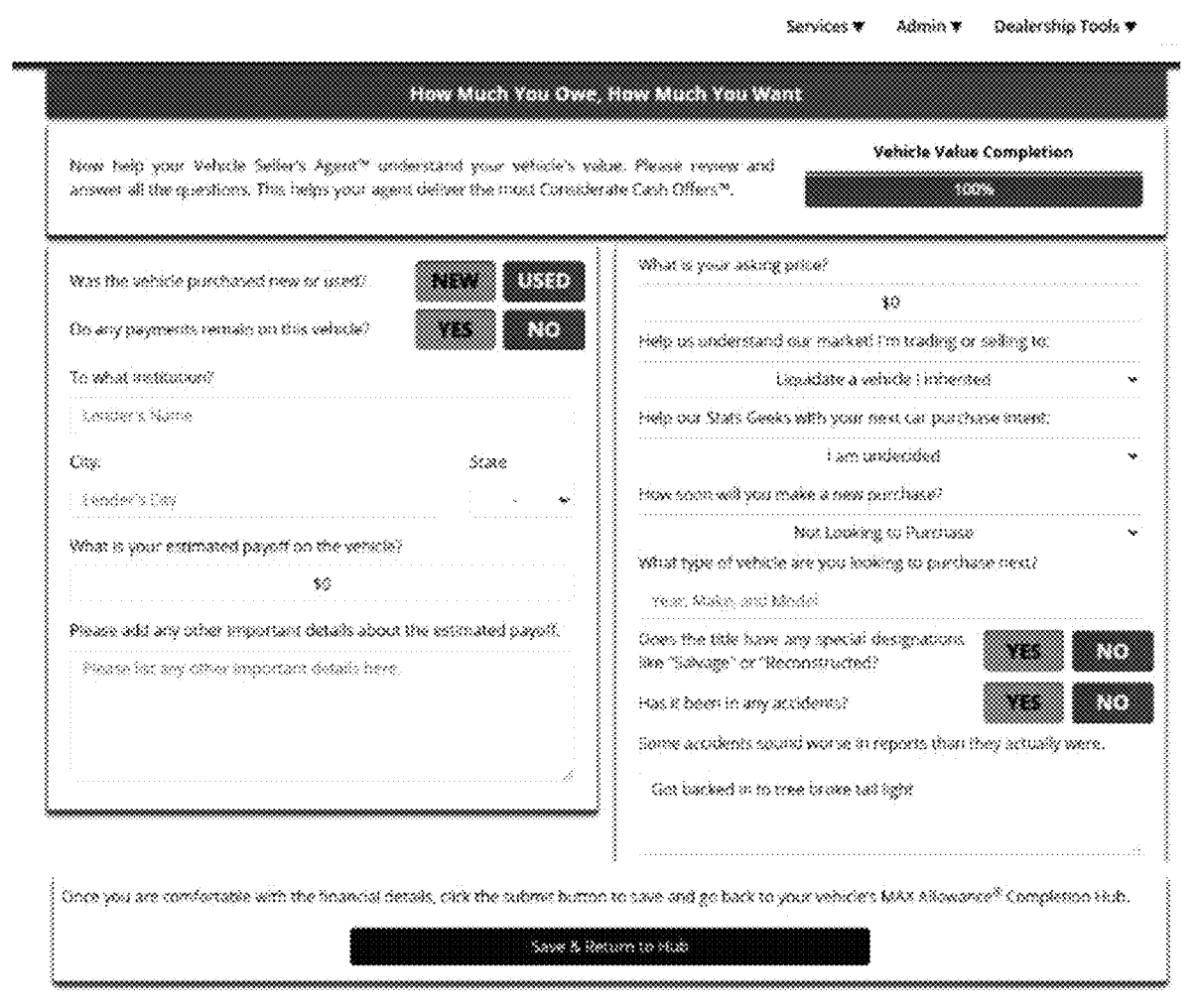

The potential customer may be asked details pertaining to the status of their ownership of the vehicle. For example, as shown in FIG. 9, the potential customer may be asked whether they are the original owner/purchaser of the vehicle, whether they have a loan on the vehicle and to what lender as well as how much remains on the loan. The potential customer may be allowed to add details about the amount that remains on the loan. The potential customer may be asked their desired sale price for the vehicle, the reasons why they are looking to sell or trade the vehicle (e.g., sell a vehicle they inherited, purchase a new vehicle, sell an unneeded vehicle, etc), whether they are looking to purchase another vehicle, how soon they are looking to purchase another vehicle, and the make/model/year of the vehicle they are looking to purchase. The potential customer may also be asked about the condition of the title of the vehicle, such as whether the title indicates the vehicle is a salvage or reconstructed title. The potential customer may also be asked whether the vehicle has been in any accidents, and the details of those accidents.

Figure 10:
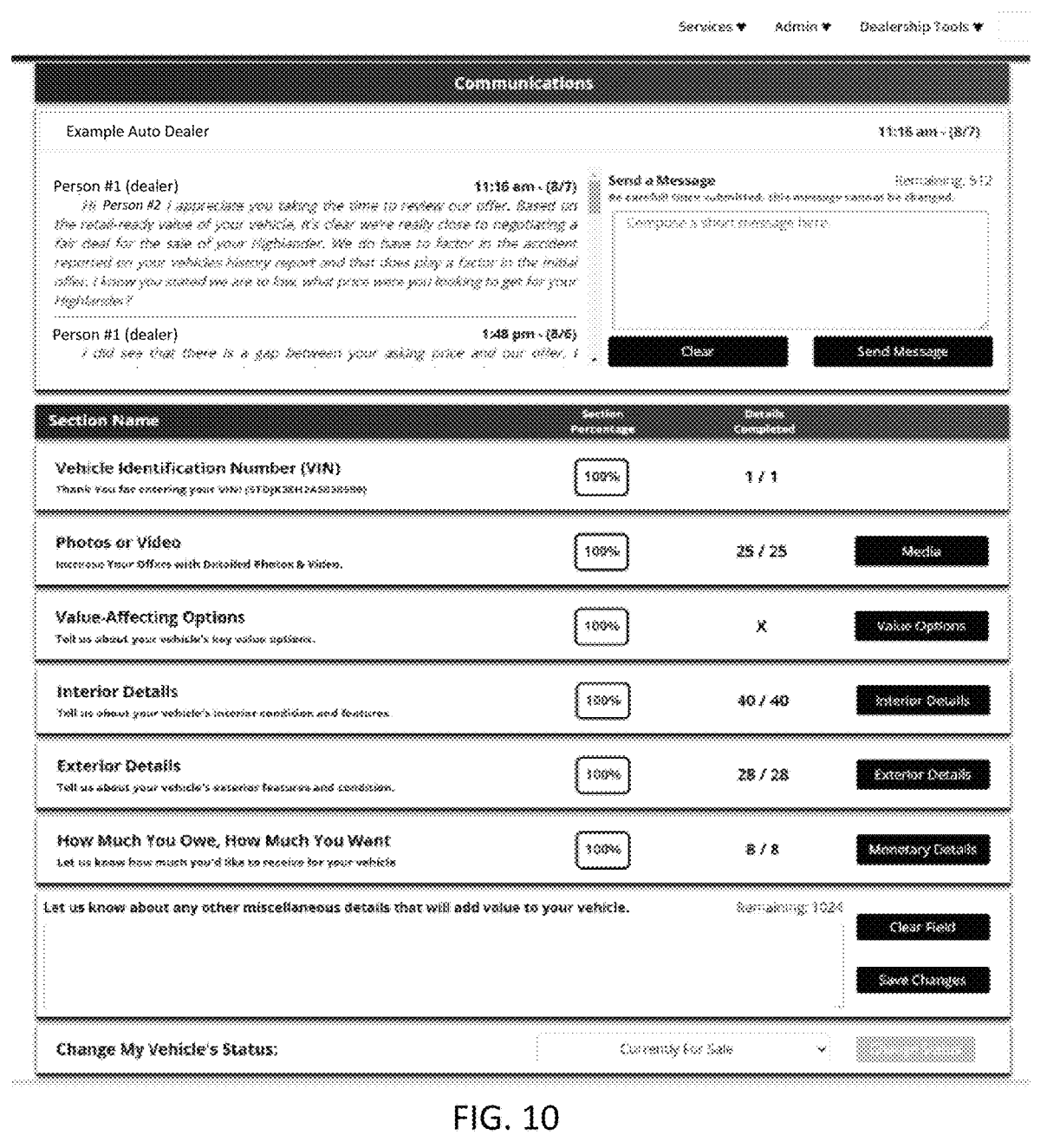

Once all details have been entered by the potential customer, or at another time set by the Max Allowance® system, the potential customer may be shown a dashboard page, such as that of FIG. 10, which indicates to the potential customer what percentage of each category of information (e.g., VIN, photo/video, value-affecting options, interior details, exterior details, financing details, etc) has been entered by the potential customer. In addition, the dashboard page may show communications that have occurred between the potential customer and an auto dealer potentially interested in purchasing the vehicle.

Figure 11:
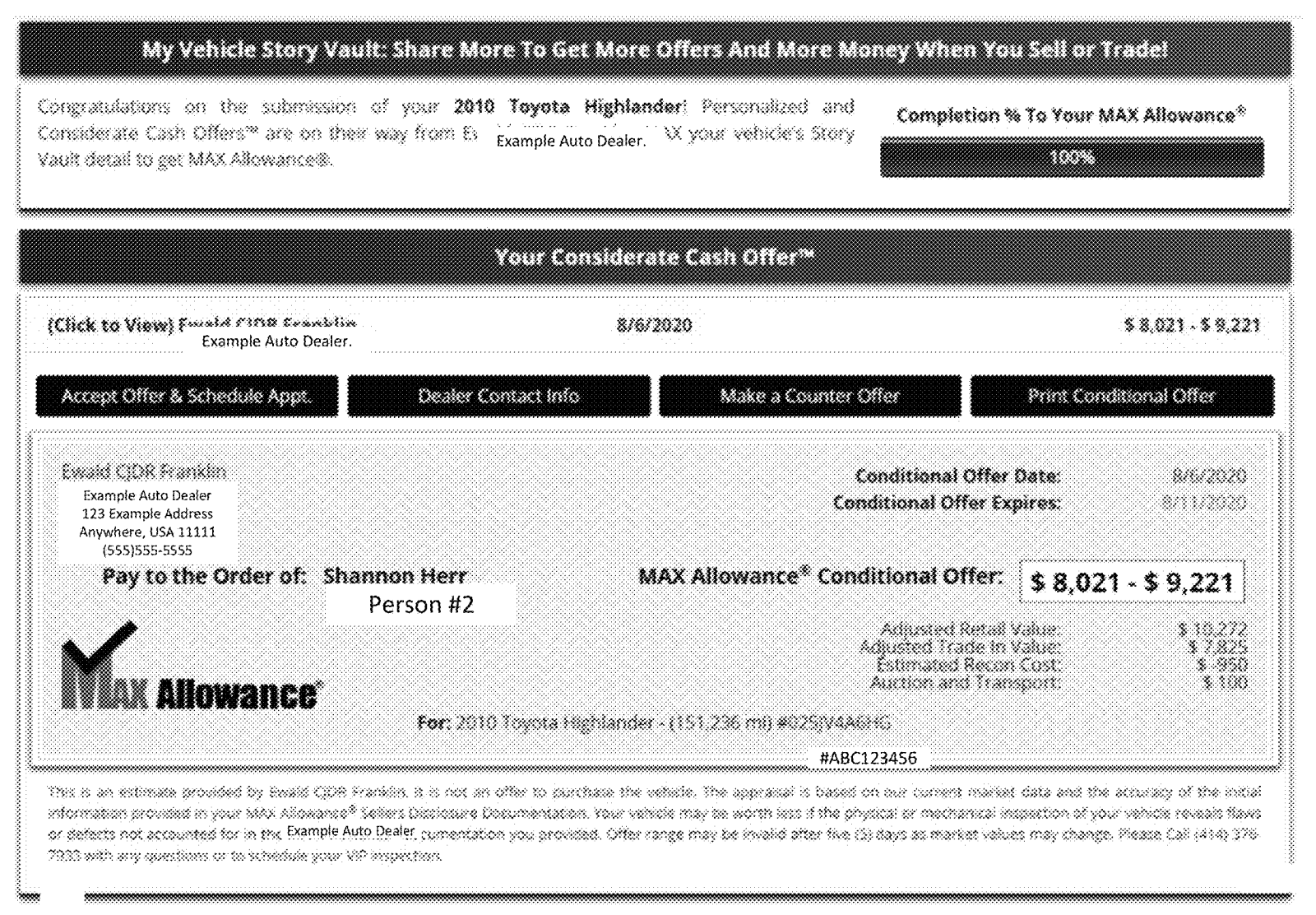

With the large amount of information about the vehicle that has been entered by the potential customer, an auto dealer can use the "Retail Down" pricing system (described below) to make an informed offer to the potential customer, and the potential customer may receive the offer on their device 30, as shown in FIG. 11. Note the level of transparency provided to the potential customer in this offer—the illustrated screen shows the adjusted retail value for the vehicle (approximately what the dealer can expect to sell the vehicle for, adjusted for the condition/features/demand for the vehicle), the adjusted trade in value of the vehicle (approximately the wholesale value of the vehicle, adjusted for the condition/features/demand for the vehicle), the estimated reconditioning cost to the dealer to get the vehicle in a condition ready to re-sell, and the savings to the dealer by acquiring the vehicle locally and not needing to pay auction fees and transport costs from the auction lot to the dealer lot. From this, for example, the potential customer can see that if the dealer were to re-sell the vehicle at $10,272, the dealer's profit would be $1,397; therefore, when the potential customer views the Max Allowance® offer, the potential customer is aware of not only how much higher the Max Allowance® offer is than what they would receive from a conventional auto dealer using the conventional "wholesale up" pricing model, but is aware of how much profit the auto dealer will make dependent on what the actual offer ends up being (a Max Allowance® offer range is provided, but the final number will come from the auto dealer in person once the auto dealer is able to verify that the information provided by the potential customer is accurate and that the images/video provided by the potential customer are representative of the vehicle). This level of transparency is near unheard of in conventional auto sales, and helps provide the potential customer with confidence and assurance that they are receiving a fair deal on the trade-in or sale of their vehicle, and helps prevent seller's remorse, which could lead the potential customer to never doing another deal with that auto dealer again. In addition, this level of transparency helps to control the expectations of the potential customer, perhaps saving the potential customer as well as the auto dealer from attempting a deal that has no chance of closing due to unreasonable expectations on the part of the potential customer as to the value of their vehicle.

Note that options are provided to the potential customer on the offer screen shown in FIG. 11. For example, the potential customer can accept the offer and schedule an appointment with the dealer to conduct the transaction, can request the dealer contact information, can make a counter-offer to the dealer, or can print the conditional offer so as to have a physical copy thereof.

Figure 12:
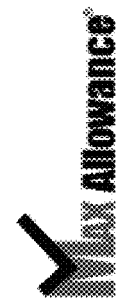
FIG. 12 shows another offer screen presented by the Max Allowance® system to a potential customer.

Another example of an informed offer made to a potential customer using the Max Allowance® system may be seen in FIG. 12 as it would be received by the potential customer on their device 30. Note that the level of transparency provided to the potential customer in this offer is even greater than in the former example—the illustrated screen shows the adjusted retail value for the vehicle (approximately what the dealer can expect to sell the vehicle for, adjusted for the condition/features/demand for the vehicle), the adjusted trade in value of the vehicle (approximately the wholesale value of the vehicle, adjusted for the condition/features/demand for the vehicle), the estimated reconditioning cost to the dealer to get the vehicle in a condition ready to re-sell, the amount the dealer is willing to add to the offer because the vehicle serves certain dealer needs (such as by being a desired make/model/trim level), the amount added to the offer for internal scarcity, and the estimated savings to the dealer by acquiring the car locally and not needing to pay auction fees and transport costs from the auction lot to the dealer lot.

Note that using the Max Allowance® system the potential customer may receive offers from multiple different auto dealers, not only allowing them to potentially maximize the money received for their vehicle, but further assuring them that they are receiving a fair deal. If a potential customer receives but one offer, in some instances (particularly when receiving offers made without the exceptional transparency provided by the Max Allowance® system), they might wonder whether that offer is actually fair. By receiving offers from multiple auto dealers, as stated, the potential customer is reassured, as they may consider it likely that one auto dealer could deliver an unfair offer but consider it unlikely that 5 different auto dealers all deliver similar unfair offers.

Figure 13:
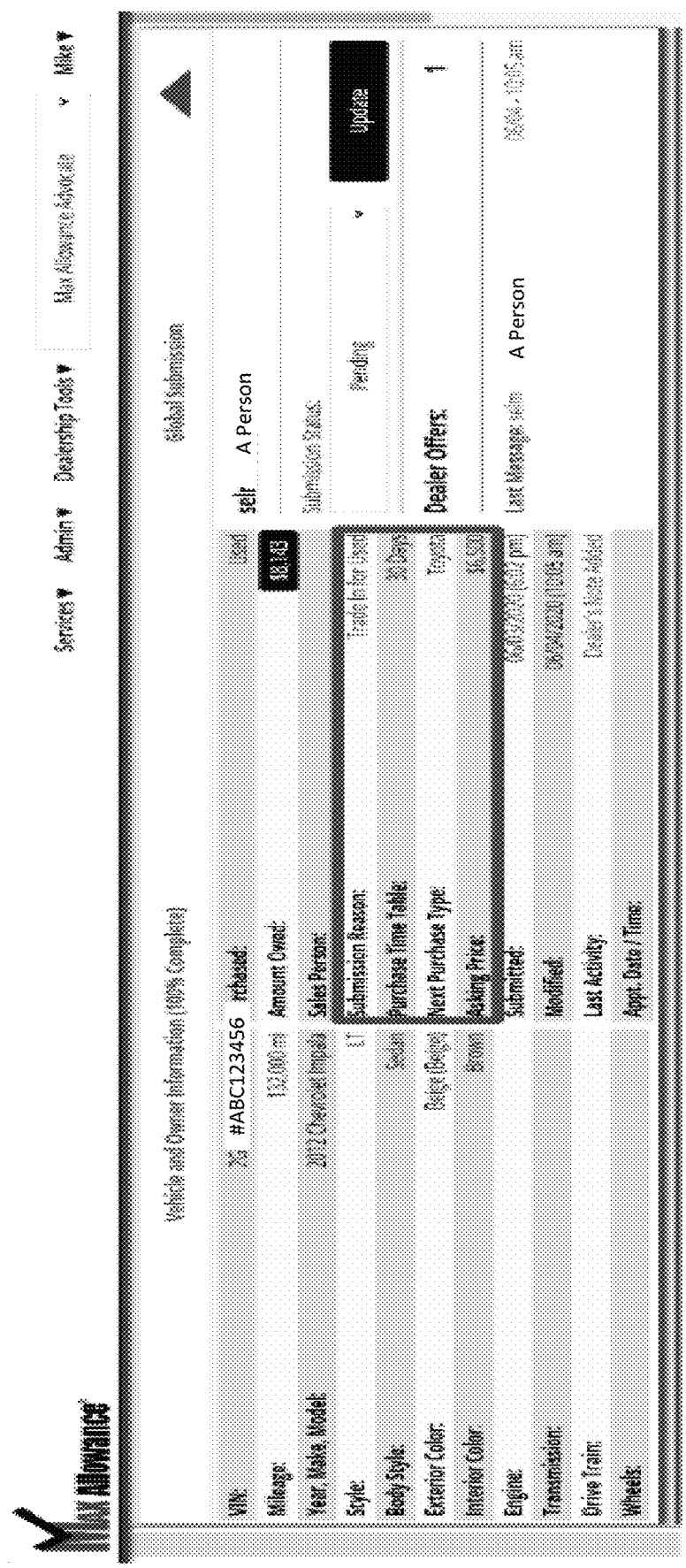
FIG. 13 shows a condensed vehicle information screen presented by the Max Allowance® system to a dealer.

Thus far, the Max Allowance® system has been shown from the perspective of a potential customer. Now, the Max Allowance® system will be shown from the perspective of an auto dealer using the dealer terminal 40 to calculate offers for vehicles using the "retail down" pricing scheme. As can be seen in FIG. 13, an auto dealer using the Max Allowance® system can view a condensed version of the vehicle and owner information input into the Max Allowance® system by the potential customer, which shows, among other things, the VIN, mileage, year/make/model, trim level, body style, exterior color, interior color, engine, transmission, drivetrain type, wheels (e.g., hubcaps, aluminum rims, upgraded aluminum rims, aftermarket wheels, etc), whether the potential customer purchased the vehicle new or not, how much the potential customer owes on a loan on the vehicle, if a sales person has been assigned to the potential customer and who that sales person is, the reason why the potential customer engaged with the Max Allowance® system in the first place (here, for example, the potential customer indicated they wish to trade the vehicle in for another used vehicle), how soon the potential customer is looking to purchase another vehicle, the make/model/year of vehicle the potential customer is looking to purchase (here, for example, the potential customer has only indicated that they want to purchase a Toyota, and has not indicated year or model), how much the potential customer would like in exchange for their vehicle, when the potential customer submitted the vehicle information to the Max Allowance® system, the last time the potential customer modified their vehicle profile in the Max Allowance® system, the last activity to the vehicle profile (for example, here being that a dealer has added a note), an appointment date/time to meet with a dealer if one has been set, the status of the submission by the potential customer, how many offers the potential customer has received, and messages received by the potential customer.

Figure 14:
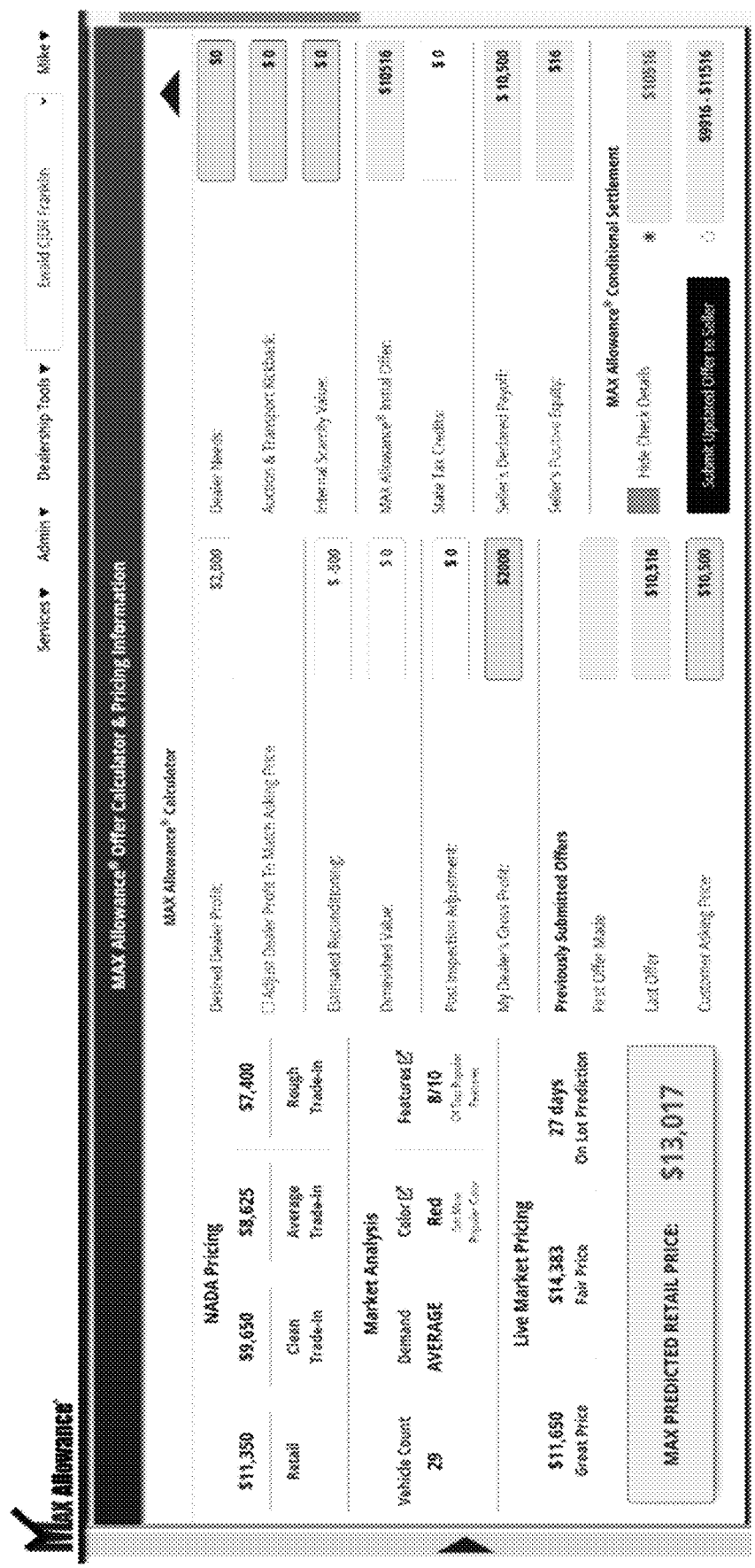
FIG. 14 shows an offer calculation screen enabling a dealer using the Max Allowance® system to make an offer to the potential customer based on the "retail down" pricing scheme.

Shown in FIG. 14 is the screen displayed to an auto dealer via their dealer terminal 40 while using the Max Allowance® system. This screen displays to the dealer the NADA estimated prices for a given vehicle for retail sale, clean-trade in value (meaning the NADA estimated trade-in price for the given vehicle if the vehicle is particularly "clean"), average trade in value (meaning the NADA estimated trade-in price for the given vehicle if the vehicle is in average condition, meaning neither particularly "clean" nor particularly "rough"), and rough trade in value (meaning the NADA estimated trade-in price for the given vehicle if the vehicle is in rough condition).

Shown on the very same display is market analysis about the vehicle, showing the number of that vehicle year/make/model (or comparable vehicles) in the market in which the dealer operates, the demand in the market for that vehicle year/make/model (or comparable vehicles), the popularity of the color of the vehicle, and how many of the most popular features for that vehicle year/make/model the given vehicle actually has. Together with this, the display shows sales pricing information—what a great price for a customer to purchase the given vehicle at would be, and what a fair price for the customer to purchase the given vehicle at would be. In addition, the display shows an estimation of how many days the given vehicle can be expected to be on the dealer's lot before it is purchased. From this, the Max Allowance® system calculates a predicted retail price for the vehicle.

The display allows the dealer to enter the desired profit on the sale of the vehicle, the estimated cost to recondition the vehicle (typically to repair things such as dents and scratches on the exterior, replace ruined floor mats, repair rips and tears to seats, etc), the diminished value of the vehicle (for example, due to the vehicle having been in an accident), and any post inspection adjustment made by the dealer (for example, the dealer may find the vehicle to be in even better condition than shown by the potential customer's uploaded images and feel comfortable in adding $500 to the estimated value, or conversely, may find the vehicle to be in worse condition than shown by the uploaded images and not feel comfortable with the original estimated value). The estimated cost to recondition the vehicle may be a set value the dealer has elected to have apply to all vehicles, and/or may be manually edited by the dealer based upon the information received from the potential customer (for example, the vehicle may have been owned by a vehicle detailing enthusiast, and therefore be in such clean and good condition that it needs no reconditioning, or may have been owned by an individual who never cleaned the vehicle, and therefore be in such poor condition that extra reconditioning is required).

Also shown on this display are potential adjustments (increases in the amount the dealer is willing to pay) due to the dealer's needs, due to the dealer saving on auction and transport fees by acquiring the vehicle locally, and adjustments due to internal scarcity (for example, a used auto dealer may have few SUVs on its lot but many customers wanting to purchase SUVs, meaning that the dealer may be willing to pay a bit more to purchase a potential customer's SUV so that they have another SUV on the lot to re-sell). From these adjustments, the Max Allowance® system calculates a gross profit the dealer can expect to make from re-selling the vehicle by reducing the desired dealer profit by the amount of the adjustments. The Max Allowance® system may allow the dealer to enter a desired gross profit for a specific deal, or as a pre-set value.

From the predicted retail price, and inputs provided by the dealer (for example, such as desired gross profit), the Max Allowance® system calculates an initial offer that the dealer can present to the potential customer, which may be adjusted for state tax credits.

Note that on this screen, the dealer is also shown the seller's declared payoff amount (which may or may not be accurate), and the Max Allowance® system calculates the seller's positive equity in the vehicle (positive equity being the difference between the Max Allowance® offer and the payoff amount). This screen allows the dealer to select to send the calculated Max Allowance® offer to the potential customer, or to send an offer range to the customer (since the dealer may need to see the vehicle in person to make a final determination). When selecting to send an offer range to the customer, the dealer may have pre-set over/under values so that, for example, the offer range is from $300 less than the calculated Max Allowance® offer to $300 more than the calculated Max Allowance® offer.

The dealer may also select whether to include the details of how the Max Allowance® offer was reached (such as were shown in FIGS. 11-12). Still further, instead of sending a Max Allowance® offer, the dealer instead may choose to simply send a message stating that the dealer accepts the potential customer's desired sale price. Additionally, although not shown, the Max Allowance® offer may include a message or information that further entices the potential customer to seek a deal with the auto dealer, such as the fact that the auto dealer has a year, make, and model of vehicle that the potential customer is interested in trading their vehicle for.

Still further, this screen also allows the dealer to submit an updated offer to the seller (potential customer), for example, offering the potential customer an extra $200 to match the potential customer's counter offer.

By working backward from the predicted retail price and considering both dealer-selected and dealer-directed expenses and dealer-selected and dealer-directed value adds, the Max Allowance® offer provides a considered cash offer that does not exist in previous systems. Note that it is common for auto dealers, without the analysis provided by the Max Allowance® system, to offer NADA rough trade-in values for most vehicles, which often scares away potential customers as they feel dissatisfied with or even insulted by the offer. However, with the level of detail about the vehicle provided to the dealer by the Max Allowance® system, together with the predicted retail price and the number of days the vehicle is predicted to be on the lot, the dealer is more confident in extending a fair offer to the potential customer, and thereby can close more deals, leading to a higher volume of business and therefore earn more profit overall. Therefore, the Max Allowance® system is unique in that it good not just for dealers, but good for customers as well.

Never before have systems provided dealers with this level of information about a vehicle they have yet to see in person, or provided dealers with this level of confidence in offers extended for vehicles they have yet to see in person, thereby accomplishing what no prior system has—bringing customers and auto dealers together in a way that increases sales numbers (and thus profits) of auto dealers but also increases the value received by customers for vehicles they sell or trade in, enabling the customers to potentially purchase a more expensive new vehicle than they would otherwise have been able to.

Figure 15:
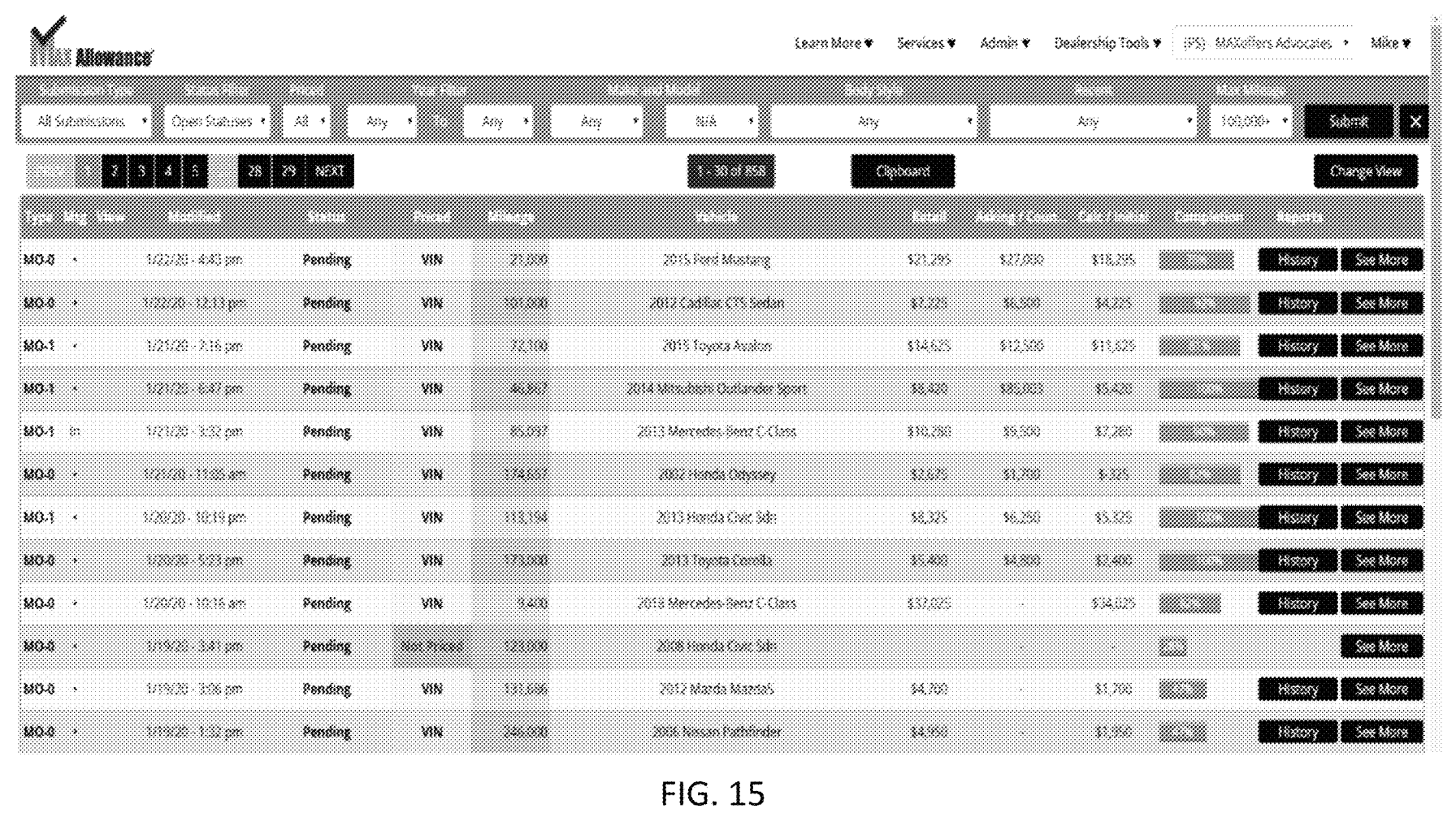
Figure 16:
FIG. 16 illustrates a dashboard shown to a dealer using the Max Allowance® system, illustrating vehicles that have been entered into the Max Allowance® system by potential customers.

A dealer may, through their dealer terminal 40, search through vehicles that potential customers have submitted to the Max Allowance® system. Sample output of such a search is shown in FIG. 15, where submitted vehicles are listed together with their retail value, the amount the potential customer has asked for the vehicle, the calculated initial Max Allowance® value, how much of the information about the vehicle requested by the Max Allowance® system that the potential customer has actually entered (for example, the owner of the 2015 Ford Mustang has entered 75% of requested information, while the owner of the 2014 Mitsubishi Outlander Sport has entered 100% of the requested information). For each listed vehicle, the dealer may review a report of the history of the interactions with the Max Allowance® system about that vehicle, or request more information. Another such dealer search is shown in FIG. 16. The vehicles displayed may be sorted by a variety of categories, such as when last modified, or even by the estimated number of days a vehicle will be on the lot of an auto dealership before it is sold. This can be particularly useful to auto dealers looking to acquire vehicles which will sell quickly.

In this example, the owner of the 2014 Mitsubishi Outlander Sport has seemingly made a typographical error in entering their asking price, as indicated by the large difference between the retail price and asking price. In such an instance, the dealer (utilizing the messaging system that will be detailed below) can send a message to that owner, requesting clarification and correction.

Figure 17:
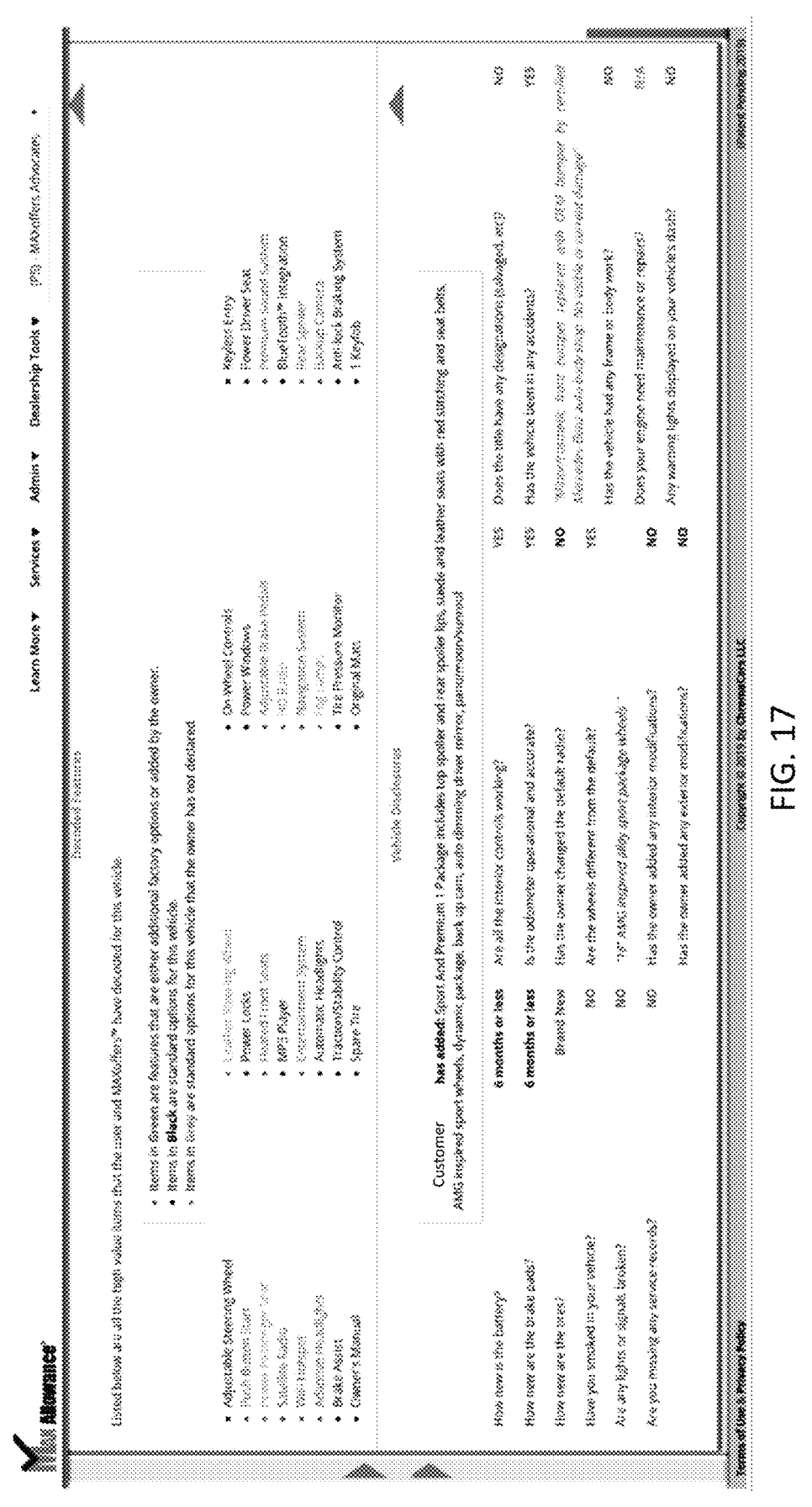

An example of a more detailed view presenting information about a vehicle viewable by a dealer using the Max Allowance® system can be seen in FIG. 17. Here, a list of options for the vehicle known to be standard (determined from the VIN) but not indicated by the potential customer is shown, a list of options for the vehicle known to be standard (determined from the VIN) but indicated by the potential customer is shown, and a list of features that are either additional factory options or aftermarket options added by the potential customer are shown. In addition, text from the potential customer indicating further features in a narrative form is shown. Additionally shown is information about the age of the battery and brake pads and information about the condition of the tires. Furthermore, also shown is information about whether the vehicle has been smoked in, whether any lights or signals are broken, whether service records are missing, whether all interior controls are working, whether the odometer is operational and accurate, whether the radio is factory or aftermarket, whether the wheels are aftermarket and text describing said wheels if aftermarket, whether the potential customer has modified the interior, whether the potential customer has modified the exterior, whether the title is clear or not (e.g., salvage, rebuilt, etc), the accident history of the vehicle, whether the vehicle has had frame or body work, whether the engine and/or transmission need maintenance or repairs, and whether warning lights are displayed on the dash. This detailed information was previously only available to dealers by viewing a vehicle in person, and not readily accessible and reviewable via a simple to use system that aids the dealer in calculating a fair trade-in or purchase value for a potential customer's used vehicle.

Figure 18:
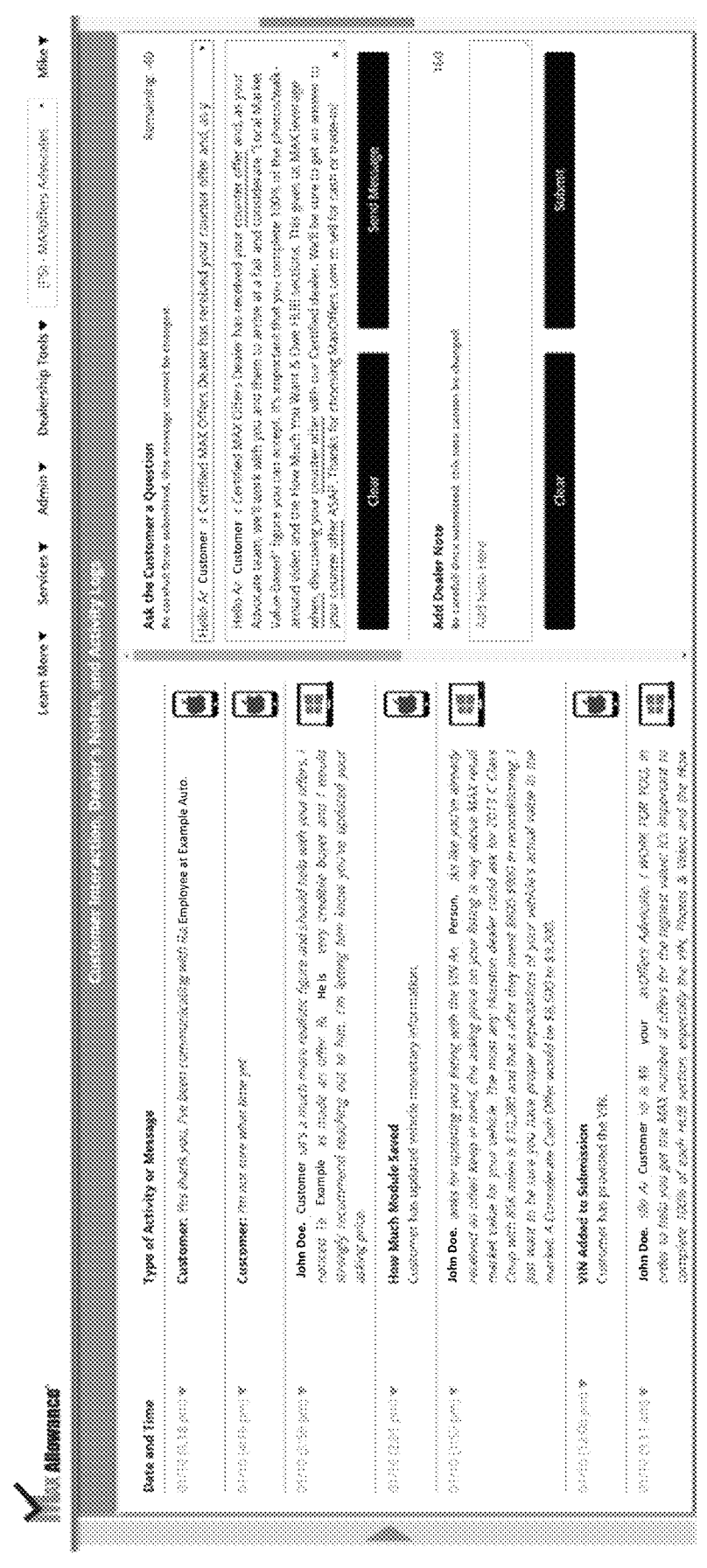

As will be appreciated from the above disclosure, the dealer may communicate with a potential customer who has submitted their vehicle's information to the Max Allowance® system. A screen viewable and usable by the dealer, via their dealer terminal 40, is shown in FIG. 18. This screen illustrates a tethered texting/SMS/e-mail system with a response and query library customizable by each individual dealer, included within the Max Allowance® system. The tethered texting/SMS/e-mail system is a unique 6-way communicator that allows dealer to communicate questions and answers with potential customers, allows potential customers to communicate directly with dealers or a dealer's call center (whether in-house or outsourced), and even allows the staff members working for the dealer or the dealer's call center to communicate with the dealer in a sidebar conversion without involving the potential customer so that the dealer can help guide the staff member into reaching a deal with the potential customer.

In greater detail, this tethered texting/SMS/e-mail system allows auto dealers or a third party call center contracted by an auto dealer or dealer group to send canned or custom-crafted text messages to a potential customer that appear to be personalized, genuine, and thoughtful to the potential customer. These personalized text messages may initiate contact with the potential customer or be responses to messages from the potential customer, and may include personalized information such as the potential customer's name, and the exact year, make, model, trim level, and color of vehicle that the potential customer has entered into the Max Allowance® system. This allows staff members at a dealership or outsourced call center to effectively manage many trade/sale conversations with potential customers and set more appointments per hour than is currently possible with conventional dealer systems.

On the screen illustrated in FIG. 18 is a message history between the dealer and the potential customer is shown, as well as a history of the potential customer's submissions (for example, showing the potential customer has updated the vehicle monetary information). Also shown is a message box into which the dealer can select canned or custom-crafted messages to be sent to the potential customer from a drop down menu, and a note box into which the dealer can add notes to be placed into the Max Allowance® system. Note here that the dealer has selected a response from a drop down menu (here, being a response in response to a dealer receiving a user's counter offer, referring to the potential customer by their name), and that the text of the response is shown below it.

Figure 19:
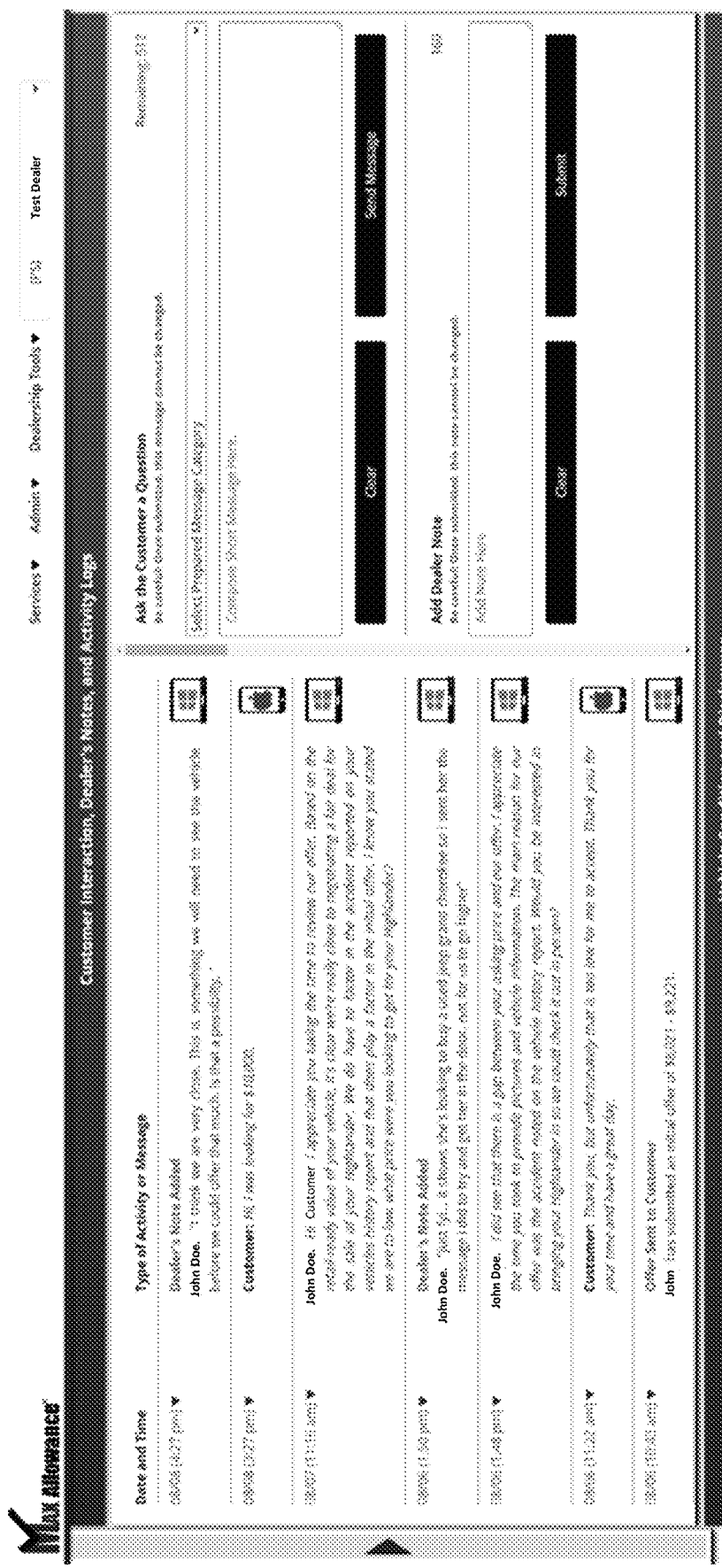
FIG. 19 shows a communications dashboard screen presented by the Max Allowance® system to a dealer, in which the dealer has not yet selected a message category.
Figure 20:
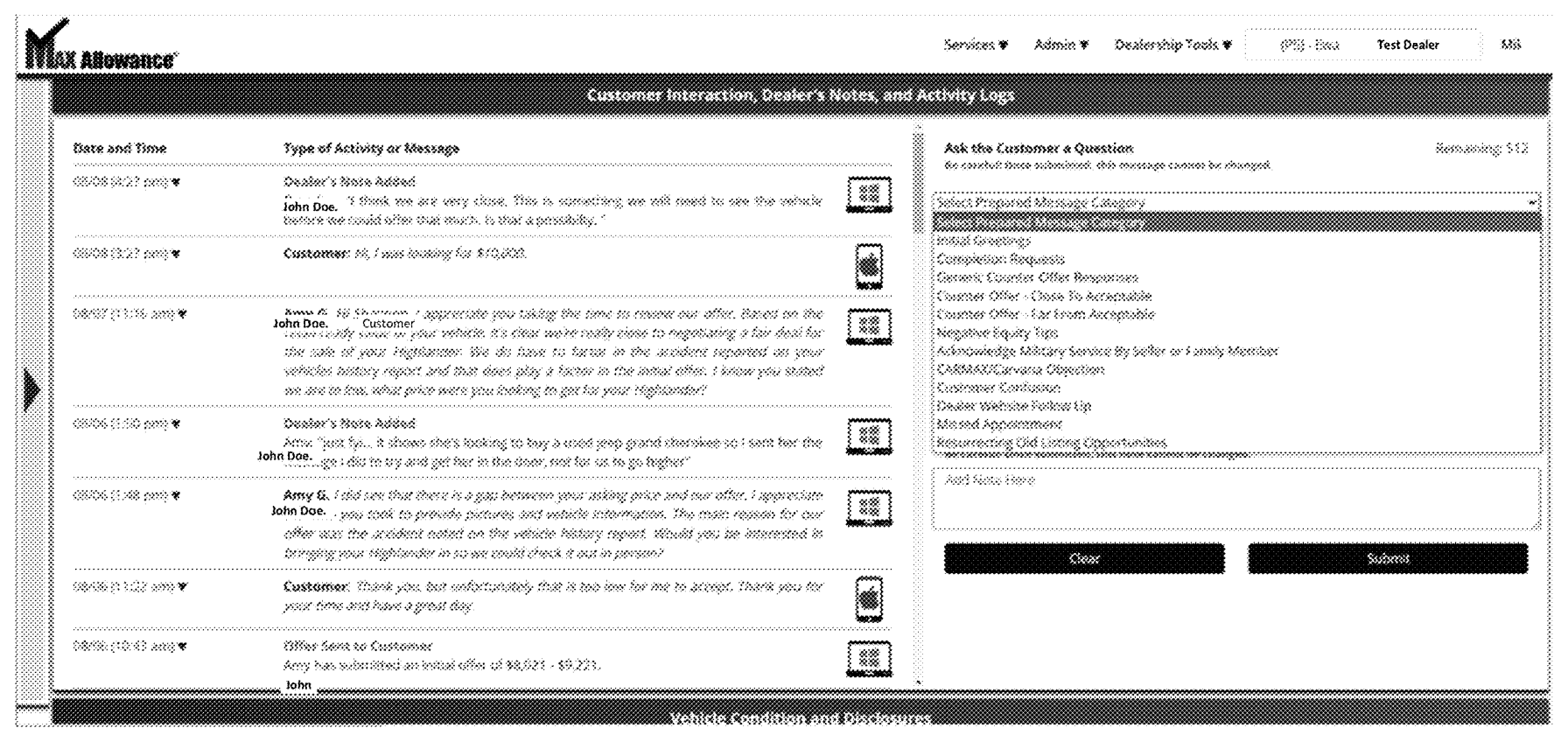
Figure 21:
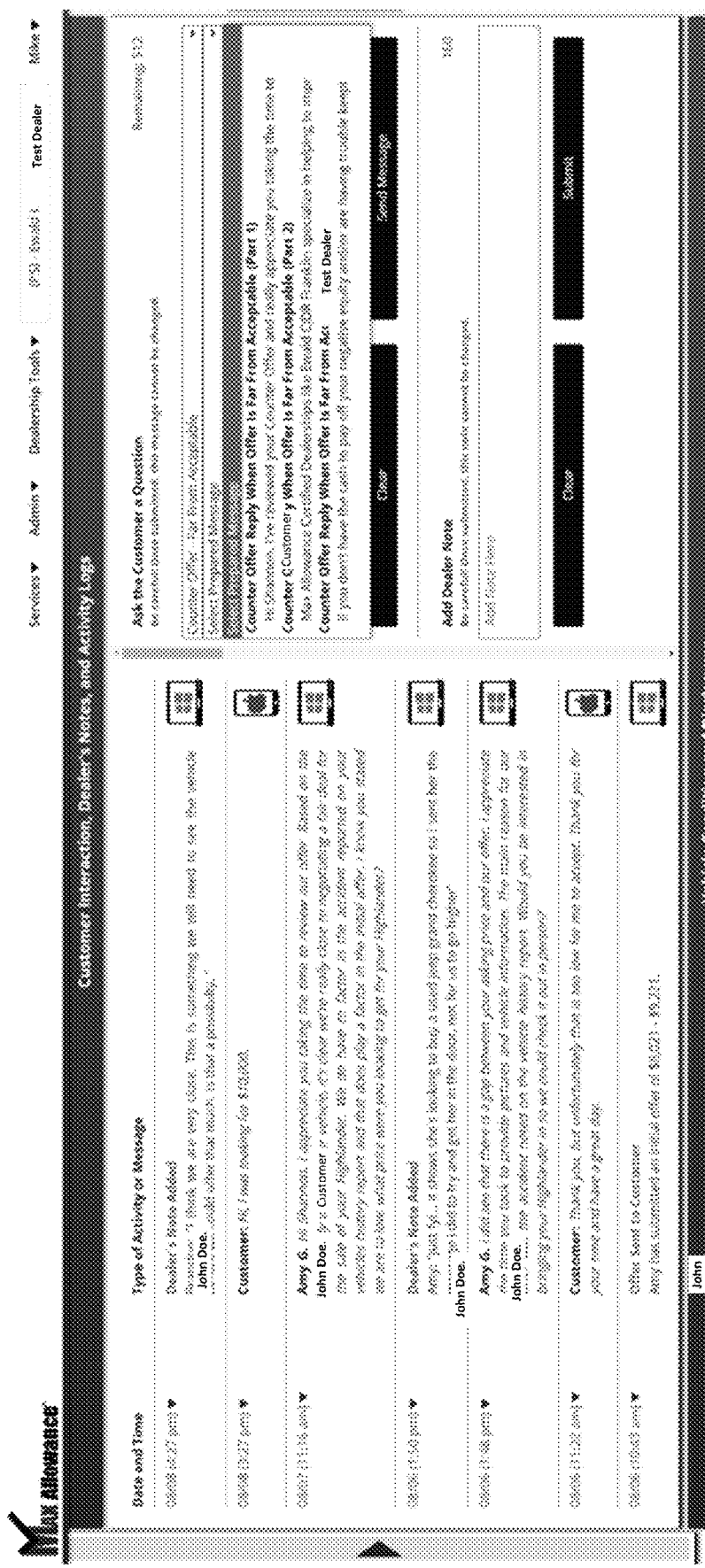
FIG. 21 shows a communications dashboard screen presented by the Max Allowance® system to a dealer, in which the dealer has selected a message category and is in the process of selecting a message to send to the potential customer.

Another such screen is shown in FIG. 19. Here, the dealer has yet to select a response category in response to the latest communication from the potential customer. Once the dealer clicks on the drop down menu, a list of categories of messages drops down, and one may be selected, as shown in FIG. 20. Once a category is selected, then individual canned or custom-crafted messages from within the selected category may be selected to send to the potential customer. Shown in FIG. 21 are messages in the drop down menu once a category has been selected, and here the messages are within the category of a counter offer submitted by the potential customer being far from acceptable.

Figure 22:
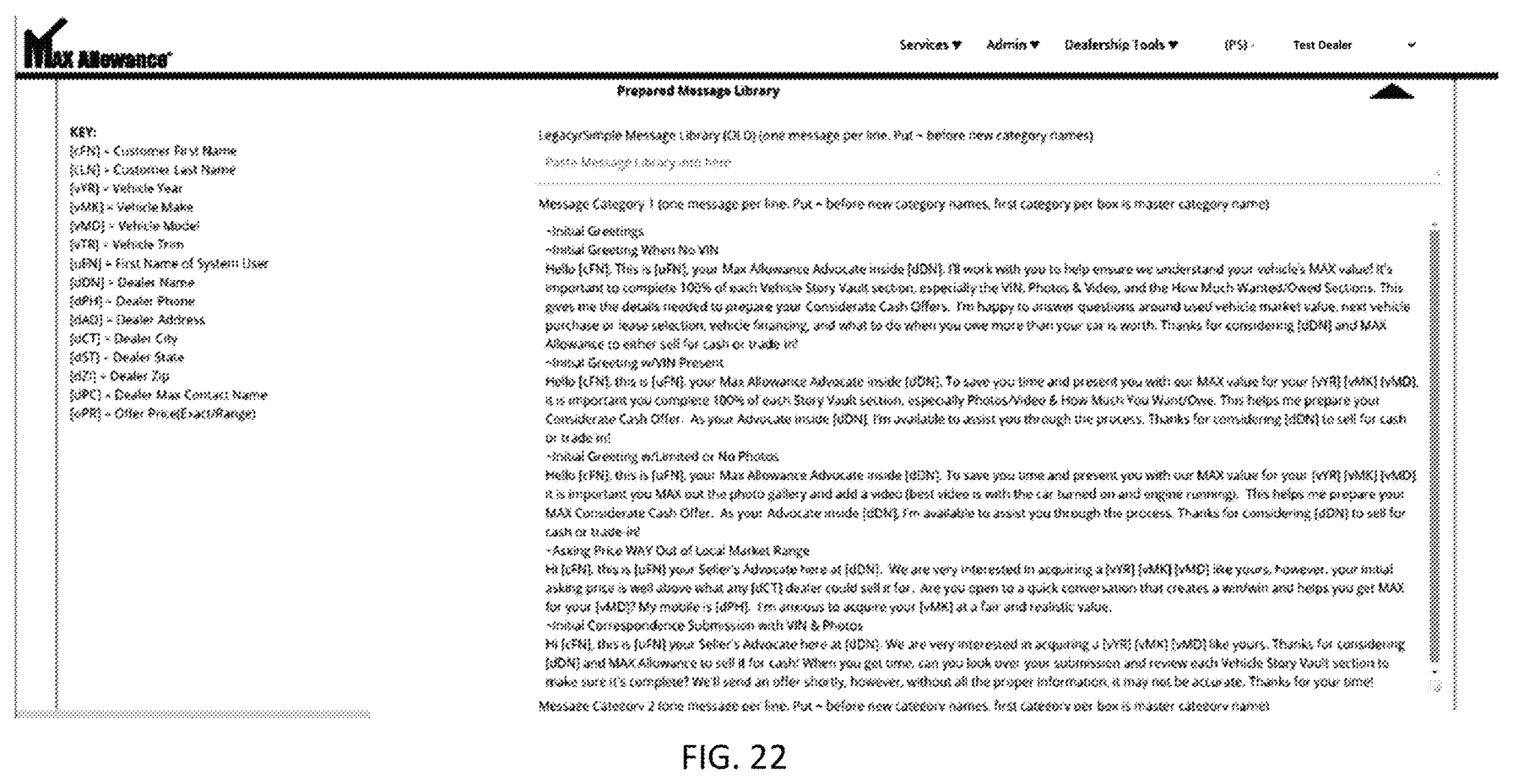

Shown in FIG. 22 is an interface in the Max Allowance® system whereby a dealer may generate an unlimited number of custom-crafted categories, and an unlimited number of custom-crafted messages per category. Note how the dealer is able to insert brand and geo-specific language into each response to thereby create a consistent consumer experience across city, state, and nationwide customer interactions. For example, when custom-crafting a message, as shown in FIG. 22, the dealer may have the following categories auto populate into the message: the customer's first name, the customer's last name, the vehicle year, the vehicle make, the vehicle model, the vehicle trim, the first name of the user utilizing the Max Allowance® system on behalf of the dealer, the dealer name, the dealer phone number, the dealer address, the dealer city, the dealer state, the dealer zip code, the contact name at the dealer for handling Max Allowance® system leads, and the Max Offer price (whether it be an exact price or a price range). Utilizing custom-crafted categories, custom-crafted messages, and auto populated categories, a dealer using the Max Allowance® system can create thousands of personalized text, SMS, and e-mail message combinations for use in quickly communicating with potential customers.

In some instances, the Max Allowance® system may facilitate the use of the tethered texting/SMS/e-mail system to create a personalized URL to help coach and drive sellers to certain dealer-requested disclosure sections of the user's Vehicle Story Vault, or to answer specific questions a dealer wants or needs to have answered in order to generate an offer or proceed with a deal.

Figure 23:
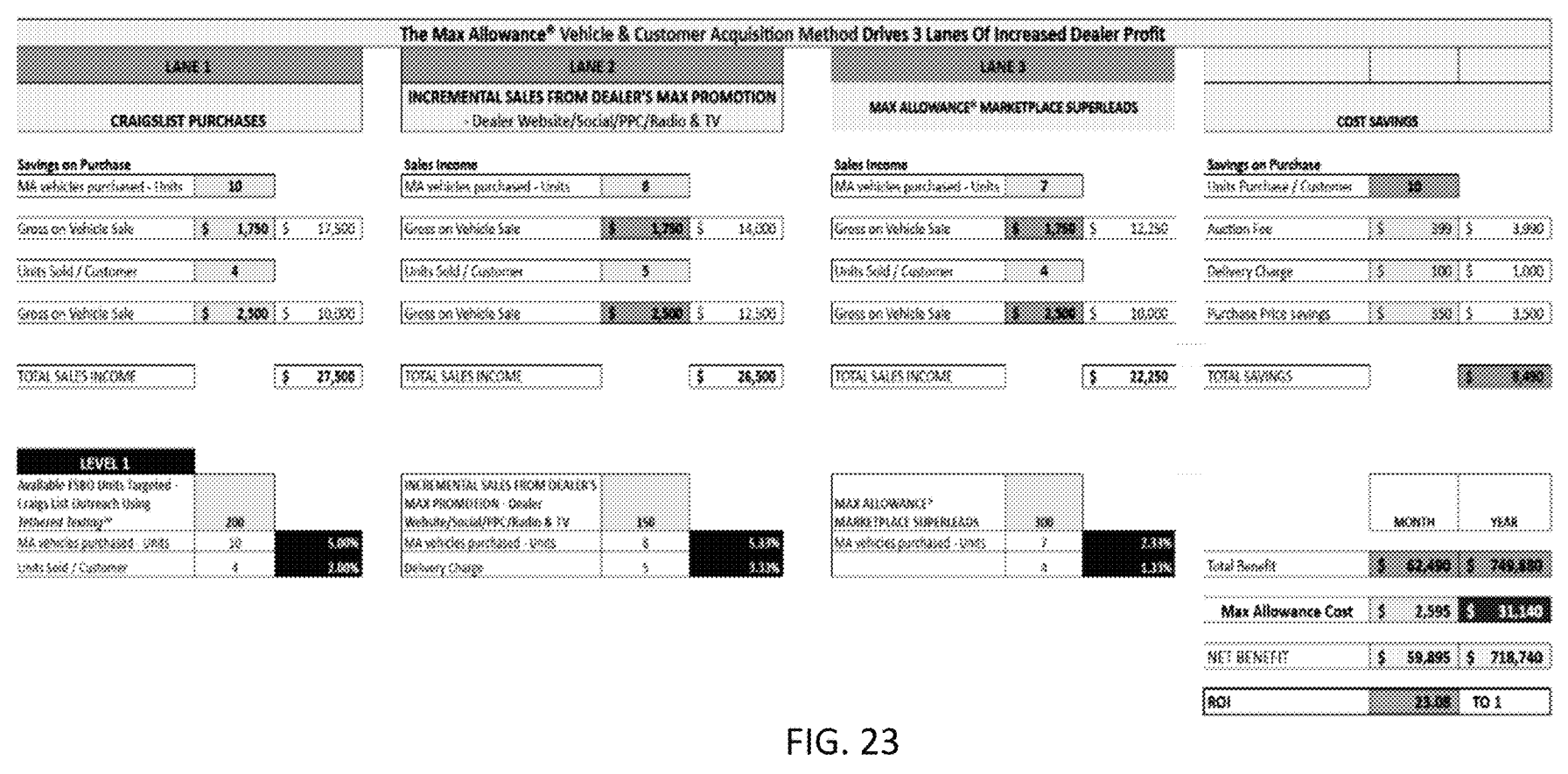

As stated above, there are three ways in which a potential customer may become engaged with the Max Allowance® system. An analysis of these is shown in FIG. 23.

In the first way, an auto dealer itself, seeking to bolster used vehicle inventory, uses the Max Allowance® system to auto-contact owners of desired vehicles (typically trucks and SUVs less than five years old and with under 100,000 miles on them), for example by extracting the contact info of those owners from the for-sale section of online classified sites such as Craigslist®, and then sending a SMS message to those owners containing a link to the Max Allowance® system. Those owners may in turn engage with the Max Allowance® system and receive an offer from the auto dealer that entices them to further engage the auto dealer and potentially reach a deal. As shown, if a dealer, using the Max Allowance® system to bolster used vehicle inventory by contacting owners of desired vehicles, purchases 10 vehicles, each of which it is able to sell at a profit of $1,750, and purchases 4 vehicles, each of which it is able to sell at a profit of $2,500, then the Max Allowance® system has enabled that dealer to earn $27,500 that it would otherwise not have earned. Note that by using the Max Allowance® system this way to acquire used vehicle inventory, dealers are able to bypass the conventional auction system and its associated costs by sourcing vehicles locally (which are shown as a $399 auction fee per vehicle, a $100 delivery charge per vehicle, and a $350 purchase price savings per vehicle), with minimal effort made on the part of the dealer due to the fact the system locates and contacts the potential customers and the potential customers input the detailed information about their vehicles, and with minimal risk to the dealer due to the use of the "retail down" pricing scheme described above.

In the second way in which a customer may become engaged with the Max Allowance® system, the potential customer visits the website of a specific auto dealer that utilizes the Max Allowance® system, and clicks on a link to begin the entry of their information into the system. When a potential customer is engaged with the system in this fashion, since the potential customer engaged the system through the website of the specific dealer, the potential customer receives an offer for the vehicle they wish to sell or trade only from that dealer, allowing that dealer to be the first to attempt to acquire the potential customer's vehicle. Here as an example, if a dealer using the Max Allowance® system purchases 8 vehicles, each of which it is able to sell at a profit of $1,750, and purchases 5 vehicles, each of which it is able to sell at a profit of $2,500, then the Max Allowance® system has enabled that dealer to earn $26,500 that it would otherwise not have earned.

In a third way in which a customer may become engaged with the Max Allowance® system, the potential customer directs the web browser on their computer, tablet, or smartphone to the Max Allowance® system (or executes the Max Allowance® application on their tablet or smartphone) after becoming aware of the Max Allowance® system, such as by encountering a social media or search engine textual or display advertisement, or by hearing a radio or observing a television or social media ad. The potential customer in turn engages with the Max Allowance® system, and receives offers from multiple different auto dealers, giving the customer confidence that the offers they are receiving are fair, and enticing the customer to engage with one of the auto dealers and potentially reach a deal. If a dealer using the Max Allowance® system in this way purchases 7 vehicles, each of which it is able to sell at a profit of $1,750, and purchases 4 vehicles, each of which it is able to sell at a profit of $2,500, then the Max Allowance® system has enabled that dealer to earn $22,250 that it would otherwise not have earned.

Adding up these three ways, if each utilized by a dealer having access to the Max Allowance® system, the dealer is able to earn an extra $62,490 in profit a month, which is an extra $749,880 in profit a year. If the dealer pays $595 a month/$31,140 a year for access to the Max Allowance® system, the net benefit to the dealer is $59,895 a month or $718,740 a year, representing a 23.08 to 1 return on investment.

Although the above has focused on the vehicle sale or trade-in aspect of the Max Allowance® system, the system also allows the potential customer to input information about a type of vehicle they would to purchase, thereby allowing auto dealers to tailor their offers and messages to the potential customer based thereupon.

In addition, although the above has focused on the use of the Max Allowance® system for vehicle trade-in and sales (by potential customer to dealer), it is not limited to vehicles, and may be used for trade-in and sales of any item from a potential customer to dealer. Non-limiting examples of the items that dealers (of any time) may utilize the Max Allowance® system when assessing trade-in (or cash purchase) value include recreational vehicles, boats, motorcycles, all-terrain vehicles, snowmobiles, jetskis, airplanes, helicopters, golf carts, powersports vehicles, industrial equipment, trailers, toy haulers, camper trailers, jewelry, and luxury watches.

The above has focused on the vehicle sale or trade-in capabilities provided to auto dealers who use the Max Allowance® system. Also described herein is the Advantage2U®, My Payment Power system that customers of auto dealers can employ to enhance their purchasing power. This system is made available to potential customers at the point of online vehicular purchase research and online vehicular shopping. Previously, the only way for a customer to learn about more quickly building equity and increasing their purchasing power was to enter a physical dealership and, at the last minute when making a deal with financing, be introduced to a bi-weekly payment option. Such bi-weekly payment options require that the customer spend an amount, such as $400, to "join the club" to become eligible to arrange bi-weekly withdraws from ones bank account while paying an extra transaction fee of $2-$4 per transaction for each such withdrawal. However, the Advantage2U®, My Payment Power system has been developed, and is now the first and only system designed to provide customer awareness and weekly education of the value and power of making weekly payments toward a vehicle loan, while providing finance fee savings to customers, as they are actively searching for vehicles to buy or lease on an auto dealer website or a third party classified vehicle listing.

As explained above, in the US vehicle market, most new and many used vehicle purchases are financed and are not cash deals. Traditional financing arrangements are used by customers to facilitate those vehicle purchases. Monthly payments under the loans that constitute traditional financial arrangements include payments to both principal and interest, and when extra funds in addition to the standard payment are included with a payment, those funds are applied to pay down the principal. By paying down the principal of the loan, the loan is paid off more quickly than the term of the loan, and equity in the property secured by the loan (e.g., the vehicle purchased) is built.

However, as also stated above, due to the inherent difficulty in budgeting one's expenses, buyers often have difficulty making one large payment per month, meaning they are particularly unlikely to pay extra funds in addition to the standard payment, and therefore are subject to the standard amortization of the loan and subject to the standard term of the loan.

This said, buyers often would be able to make one smaller payment per week, as this eases the burden of strictly maintaining personal budgets. The Advantage2U® system has therefore been developed to allow vehicle purchasers to make one easy payment per week instead of making one payment per month, and is arranged so as to enable the buyer to reduce the loan term and the amount of interest paid, thereby increasing the buyer's purchasing power. By reducing the loan term and the amount of interest paid, the Advantage2U system in turn improves the buyer's credit rating and reduces the buyer's interest rates on future car loans, thereby even further increasing the buyer's purchasing power over time. This clearly benefits the buyer, but also benefits auto dealers as it enables more expensive and more frequent vehicle purchases.

To accomplish these myriad of benefits, the Advantage2U® system collects one quarter of the total monthly payment per week (together with a transaction convenience fee of $2.49 per transaction) and holds that money in escrow, but then pays the customer's loan for them on a monthly basis and on time, eliminating the possibility of expensive late fee assessments by the customer's financial institution. The financial institution may or may not become aware that the customer has employed the Advantage2U® system to make their loan payments on their behalf.

Extra funds collected due to the weekly payments are applied to the loan principal. This results in the customer paying one quarter of the monthly payment for 52 weeks in a given year; therefore, instead of the customer making 12 monthly payments, the customer has made 13 monthly payments in a given year, and under common vehicle loans, the extra amounts paid are directly applied to the principal of the loan. By paying extra toward the principal of the loan as occurs using the Advantage2U® system, the loan is paid off in less time than the total loan term would indicate, the total amount of interest paid under the loan is decreased, and the amount owed on the loan at most points during the loan is less than the expected amortized amount at that point.

As an example, if a vehicle purchaser were to obtain a $25,000 loan at 6.0% for 66 months, their monthly payment would be $445.66 per month, for a total of $5347.92 total paid a year toward the loan. If that vehicle purchaser were to instead be enabled to pay $111.42 per week, they would pay a total of $5793.84 a year toward the loan, representing an entire extra payment of $445.92 made a year. For a loan term of 66 months, by paying $445.66 per month, a total of $29,413.56 is paid; however, for a term of 66 months, by paying $111.42 per week, a total of $31866.12 is paid, meaning that the buyer's purchasing power is increased by $2452.56.

As an example of how the Advantage2U® system can further help build a customer's purchasing power, if the vehicle purchaser were asked if they could afford an extra $520 a year toward their vehicle loan, the answer would likely be no; if the vehicle purchaser were asked if they could afford an extra $43.33 a month toward their vehicle loan, the answer might still be no; however, if the vehicle purchaser were asked if they could afford an extra $10 a week toward their vehicle loan, the answer would likely be yes. Therefore, the Advantage2U® system advantageously provides the option for vehicle purchasers to add an additional amount to each week's payment, such as $10. In this instance, where the Advantage2U® system is utilized to make 52 weekly payments, each with an extra $10 added thereto, an extra $965.92 per year would be paid on the loan. For a loan term of 66 months, by paying $445.66 per month, a total of $29,413.56 is paid; however, for a term of 66 months, by paying $121.42 per week, a total of $34,726.12 is paid, meaning that the buyer's purchasing power is increased by $5312.56.

The above described increase in purchasing power is particularly advantageous because it helps the purchaser to arrive at a position of positive equity in the vehicle and continue to build that positive equity (thereby enabling the purchaser to more often buy new vehicles), or enables the purchaser to have bought a more expensive vehicle.

Positive equity is often difficult for buyers to achieve due to high vehicle prices coupled with vehicle depreciation that is more aggressive than loan paydown schedules, often made even worse buy the buyer having rolled negative equity from their previous vehicle into their new vehicle. Therefore, while the Advantage2U® system can be advantageous and desirable for all buyers, it can be particularly so for buyers in the position of having negative equity.

Previous to development of the Advantage2U®, My Payment Power system, which is made available to potential customers at the point of online vehicular purchase research and online vehicular shopping, the only way for a customer to learn about more quickly building equity and increasing their purchasing power was to enter a physical dealership and, at the last minute when making a deal with financing, be introduced to a bi-weekly payment option. Such bi-weekly payment options require that the customer spend an amount, such as $400, to "join the club" to become eligible to arrange bi-weekly withdraws from ones bank account while paying an extra transaction fee of $2-$4 per transaction for each such withdrawal. However, the Advantage2U®, My Payment Power system has been developed, and is now the first and only system designed to provide customer awareness and weekly education of the value and power of making weekly payments toward a vehicle loan, while providing finance fee savings to customers, as they are actively searching for vehicles to buy or lease on an auto dealer website or a third party classified vehicle listing.

Figure 24:
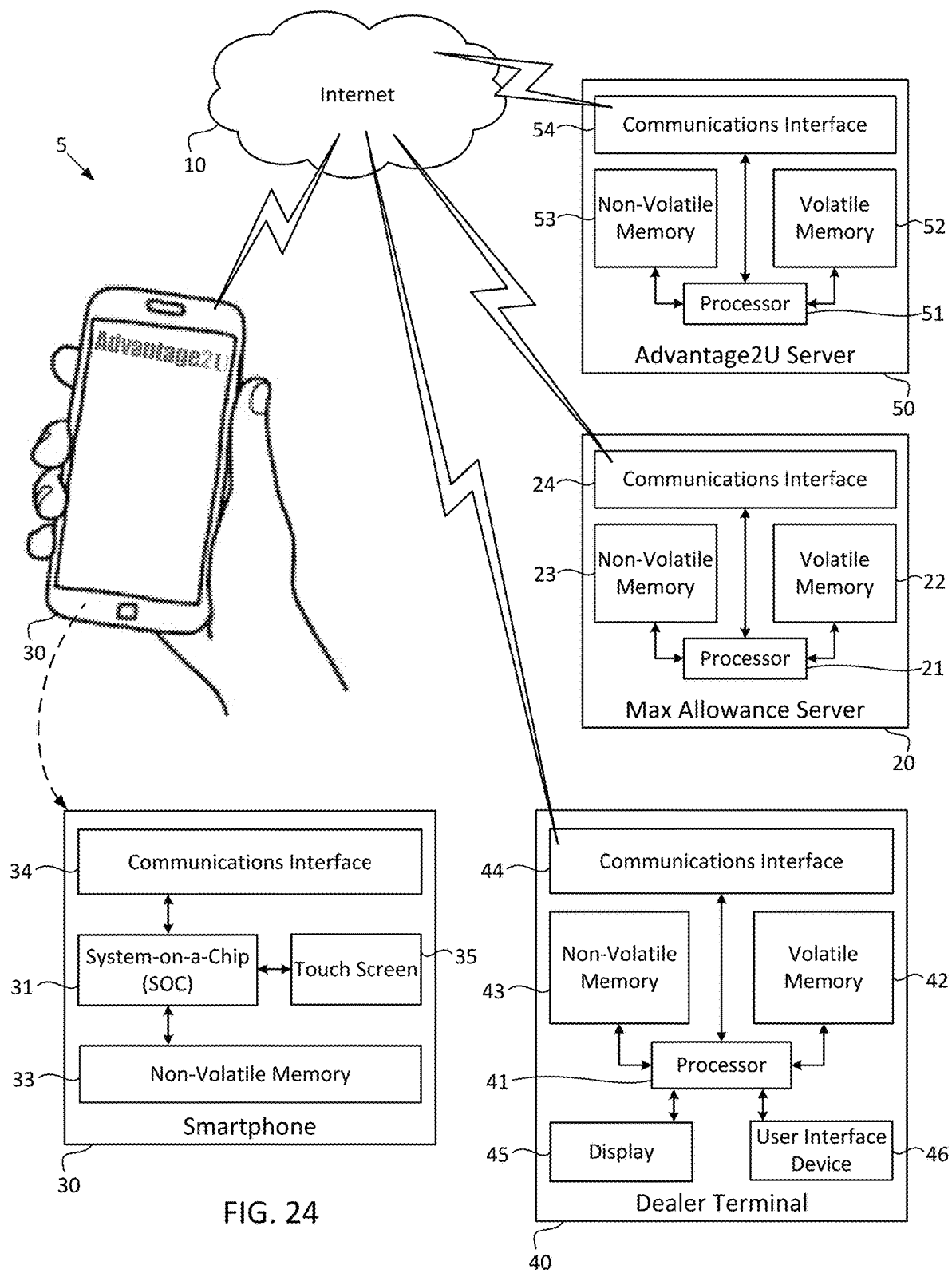
FIG. 24 is a block diagram showing the hardware on which the Advantage2U® system described herein operates.

Now referring to FIG. 24, the Advantage2U® system is embodied within the Advantage2U server 50, that includes a processor 51 cooperating with a volatile memory 52 (e.g., RAM) and a non-volatile memory 53 (e.g., a hard drive) to execute the functions of the Max Allowance® system that will be described below. A communications interface 54 (e.g., ethernet interface) of the Advantage2U server 50 facilitates communications, over the internet 10, to the Max Allowance Server 20, user device 30, and dealer terminal 40.

Figure 25:
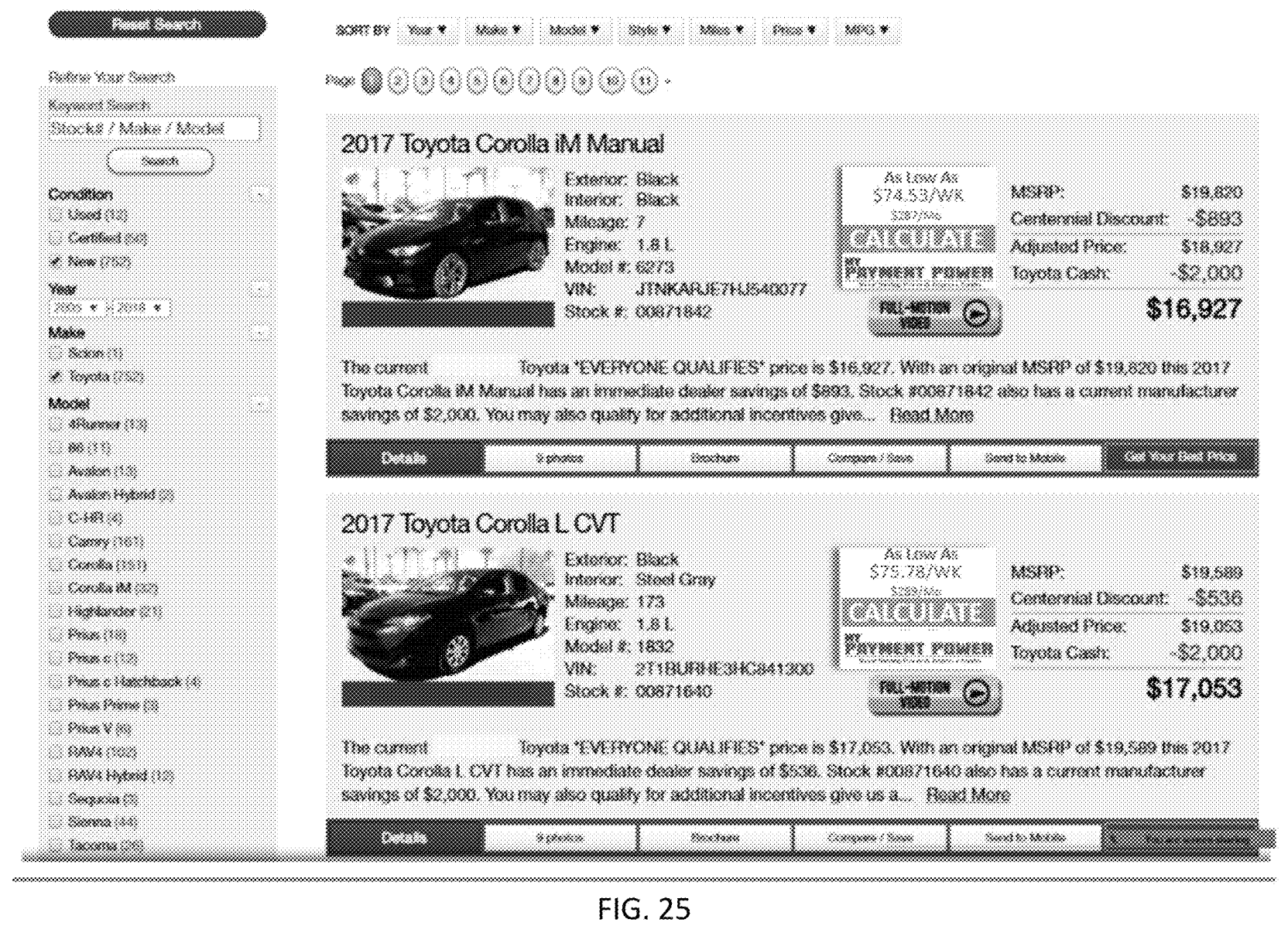

As shown in FIG. 25, potential customers may initiate engagement with the Advantage2U® system via a java widget on an auto dealer website that displays a weekly price for advertised vehicles (the weekly price being based on default parameters set by the dealer, such as the purchaser having good credit, placing a given amount of money as a downpayment, and selecting a given duration loan), or may directly initiate engagement with the Advantage2U® system by visiting the Advantage2U® website.

Figure 27:
Figure 28:
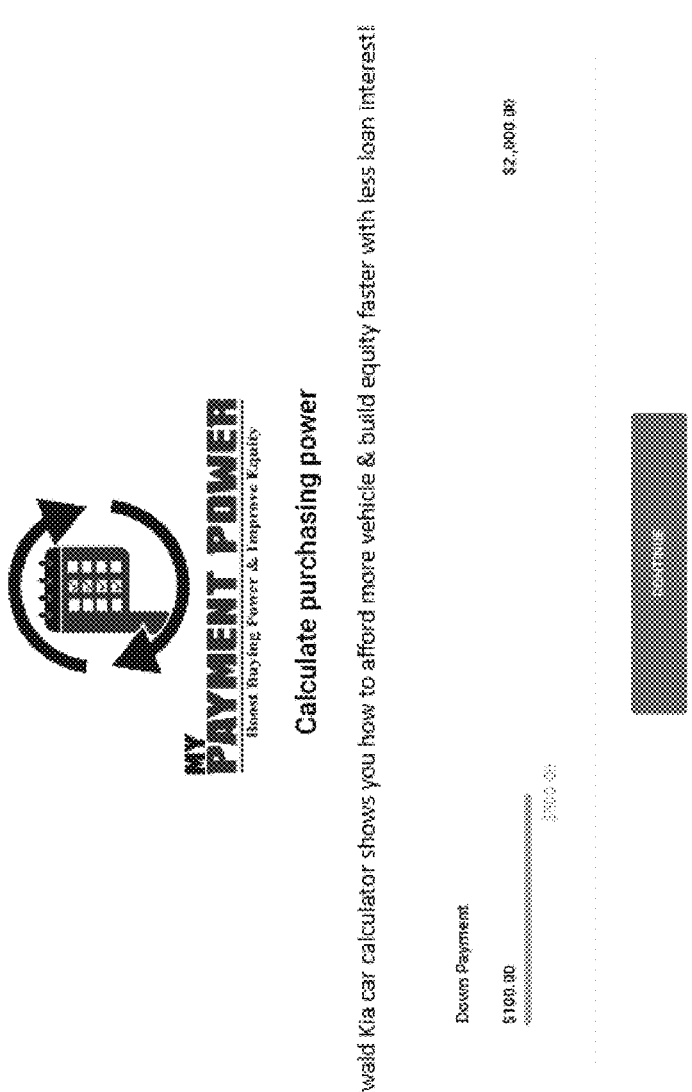
Figure 29:
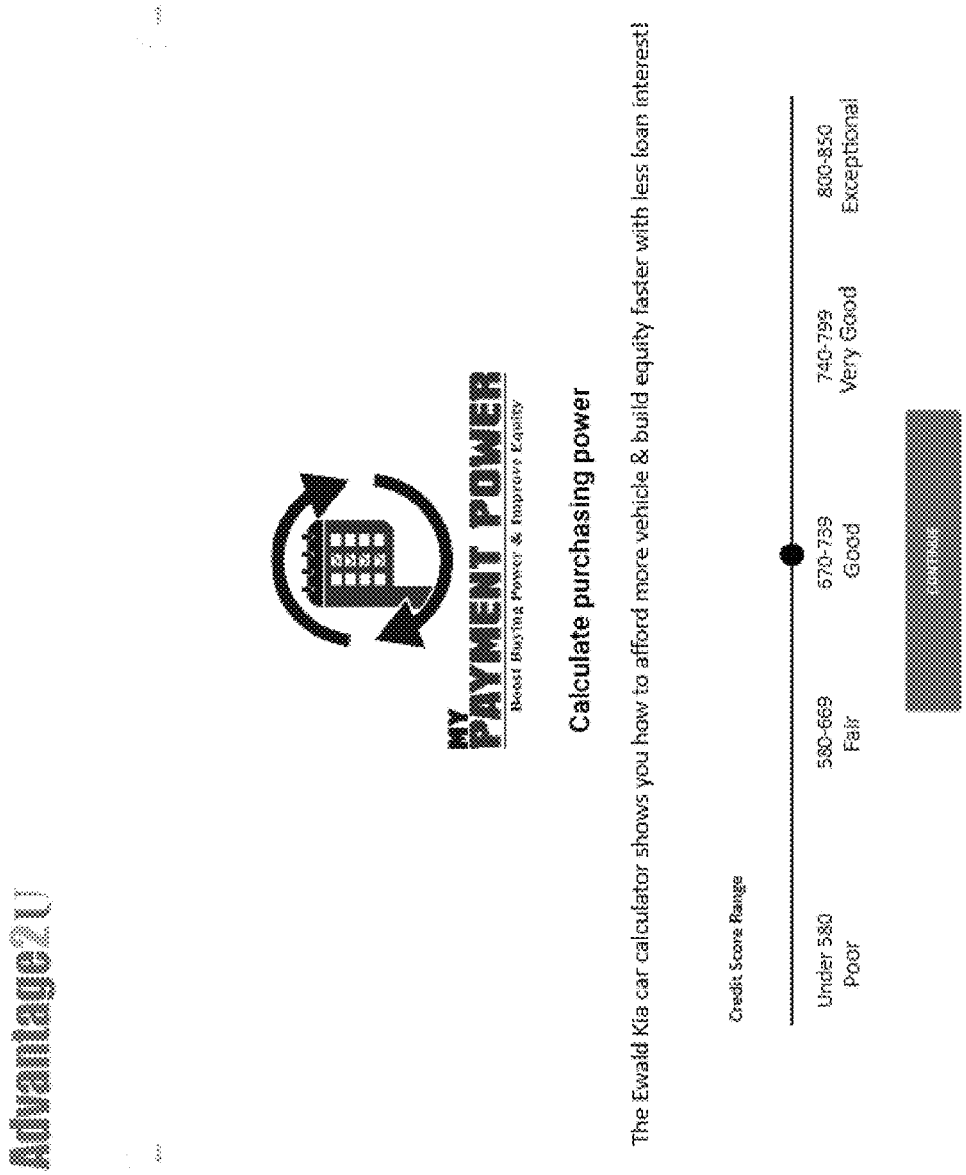

Once engaged with the Advantage2U® system, as shown in FIG. 26, potential customers are asked to enter a monthly payment amount they can afford. Then, as shown in FIG. 27, potential customers are asked to enter a desired loan length. Thereafter, as shown in FIG. 28, potential customers are asked to enter a downpayment they can afford. Next, as shown in FIG. 29, potential customers are asked to enter their credit score range. Notice that in FIGS. 26-29, the advantages of the Advantage2U® system are explained to the potential customer under the continue button.

Figure 30:
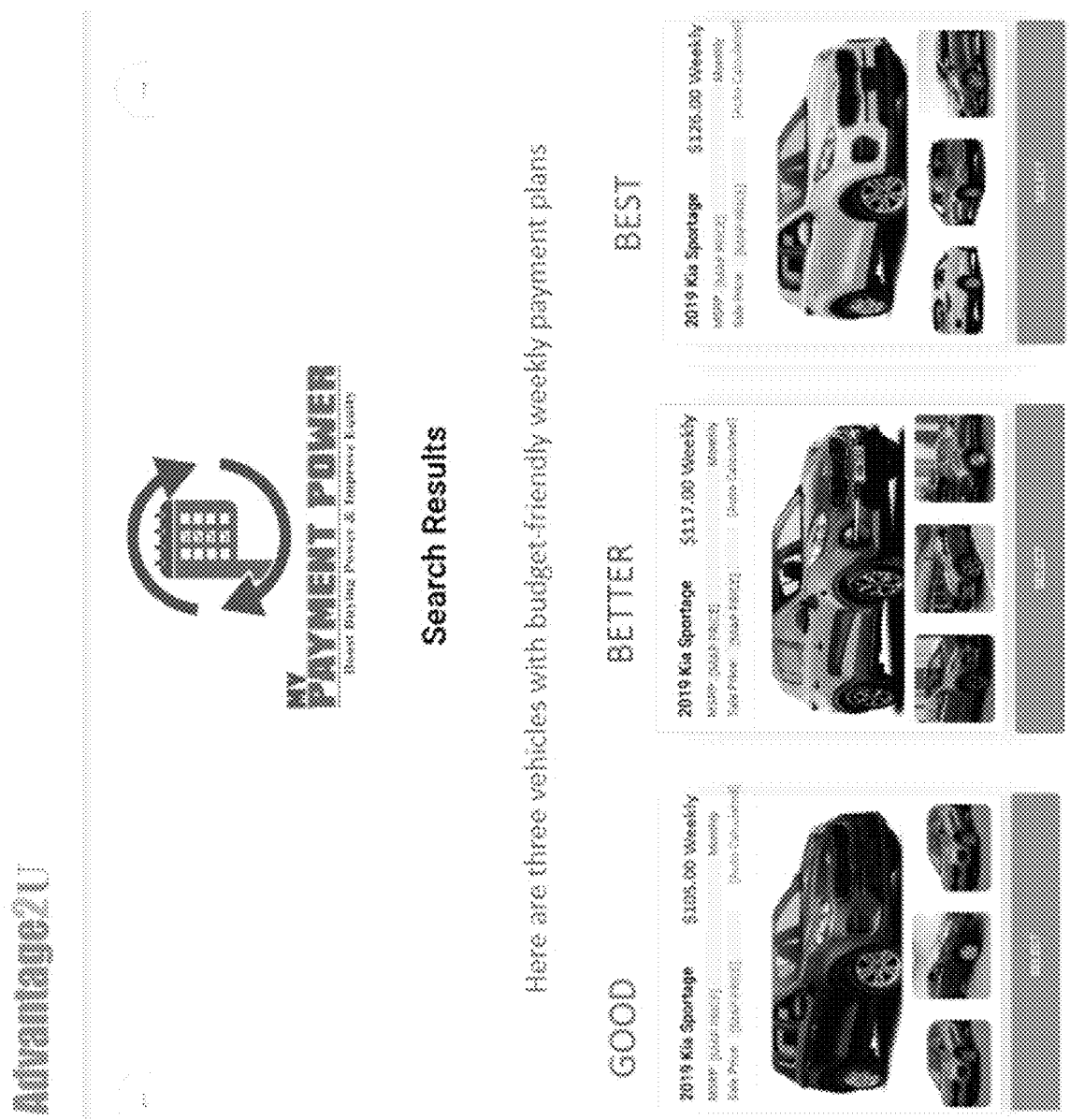
FIG. 30 is a display presented to a potential customer by the Advantage2U® system, showing different vehicles available for different affordable weekly payment amounts.

The Advantage2U® system next displays vehicles to the potential customer that fit within the budget defined by the inputs the potential customer has made to the system, as shown in FIG. 30. These vehicles are displayed as being priced with weekly payments, and may be ranked as "good", "better", and "best". Here, the same make and model of vehicle (illustratively a Kia Sportage) is displayed, with "good", "better", and "best" denoting different trim levels.

Figure 31:
FIG. 31 is a display presented to a potential customer by the Advantage2U® system that simply, cleanly, and in detail shows the advantages of the Advantage2U® system to the potential customer.

Once the potential customer has selected which vehicle they are interested in, the Advantage2U® system displays the difference between financing the vehicle using conventional financing and a conventional payment plan, and using the same conventional financing but the Advantage2U® system payment plan instead, as can be seen in FIG. 31. For example, here, for a $500 payment on a 72 month loan, the potential customer's purchasing power is $28,700, and may suffer late payment fees if they make a monthly payment late. However, for a weekly payment of $125 (which is equal to $500/4), the effective term of the 72 month loan is reduced to 66 months, and the potential customer's purchasing power is increased to $31,100, with the payment benefit accelerated by $3,000, and a $208.40 reduction in interest being paid. Also, due to the extra money paid toward principal using the Advantage2U® system, late payment fees are eliminated after a few months of on-time payments.

If the potential customer wishes to further increase their purchasing power by increasing their weekly payment by $37 to $162, the effective term of the 72 month loan is reduced to 60 months, and the potential customer's purchasing power is increased to $34,100, with the payment benefit accelerated by $6,000, and a $419.83 reduction in interest being paid. Here, too, late payment fees are eliminated after a few months of on-time payments.

Figure 32:
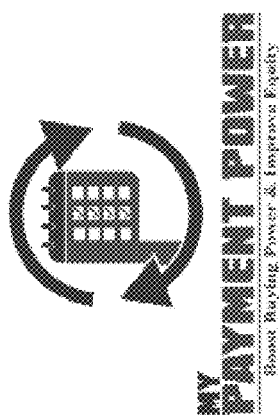
FIG. 32 is a display prompt to a user by the Advantage2U® system asking the user to input their contact information.

Shown in FIG. 32 is how, either initially or after the potential customer has chosen one of the Advantage2U® system options on the previously screen, the potential customer is prompted for their contact information.

Shown in FIG. 33 is a payment calculator screen accessible after the potential customer has entered their contact information. This payment calculator screen illustrates the above referenced advantages of making payments using the Advantage2U® system instead of making monthly payments.

Figure 34:
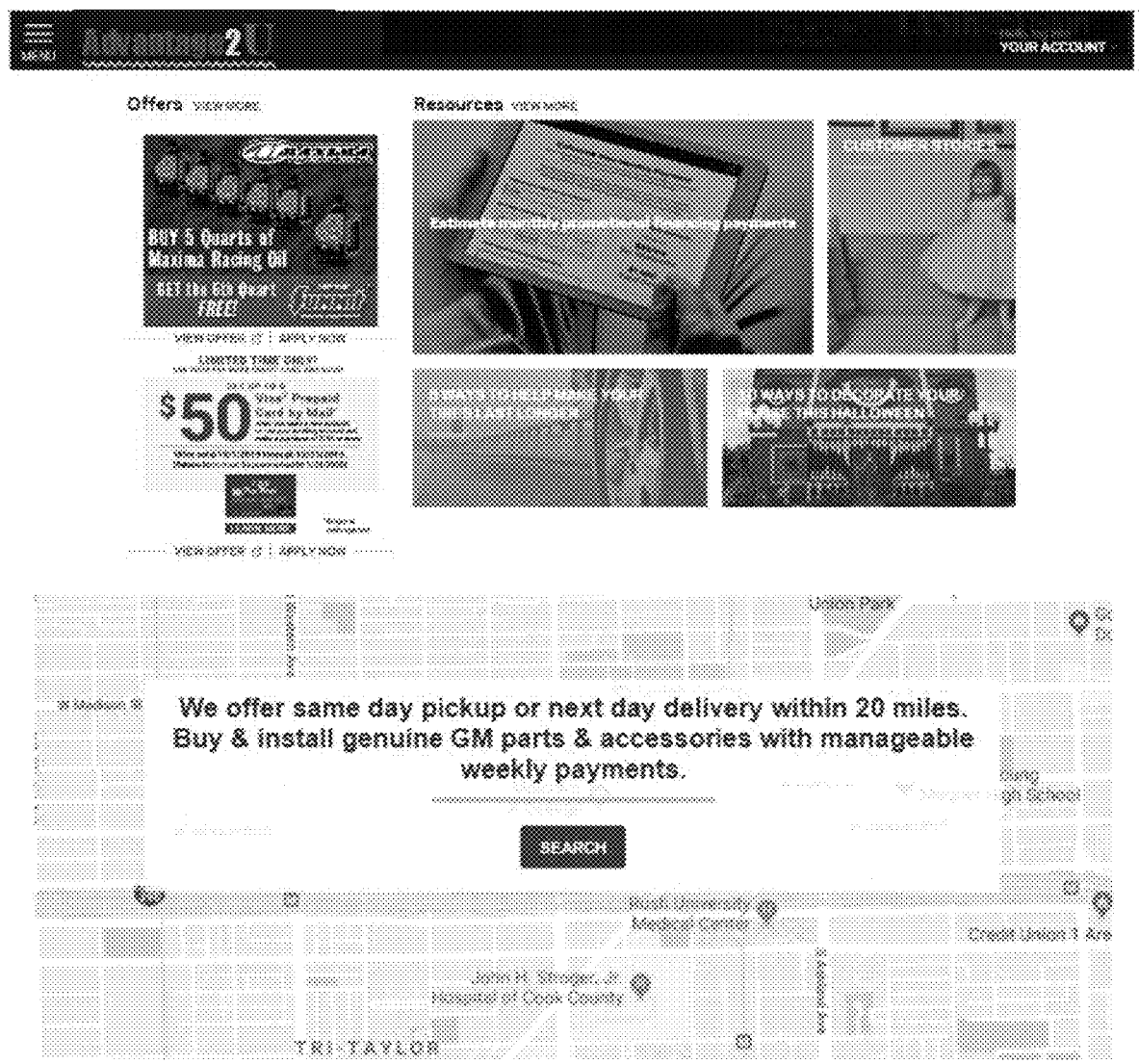
FIG. 34 illustrates how the Advantage2U® system can display offers for parts and service to a user when they log in to make their weekly payments.
Figure 37:
FIGS. 37-38 illustrated how the Advantage2U® system may offer parts and services to a customer, also on a weekly payment basis.
Figure 38:
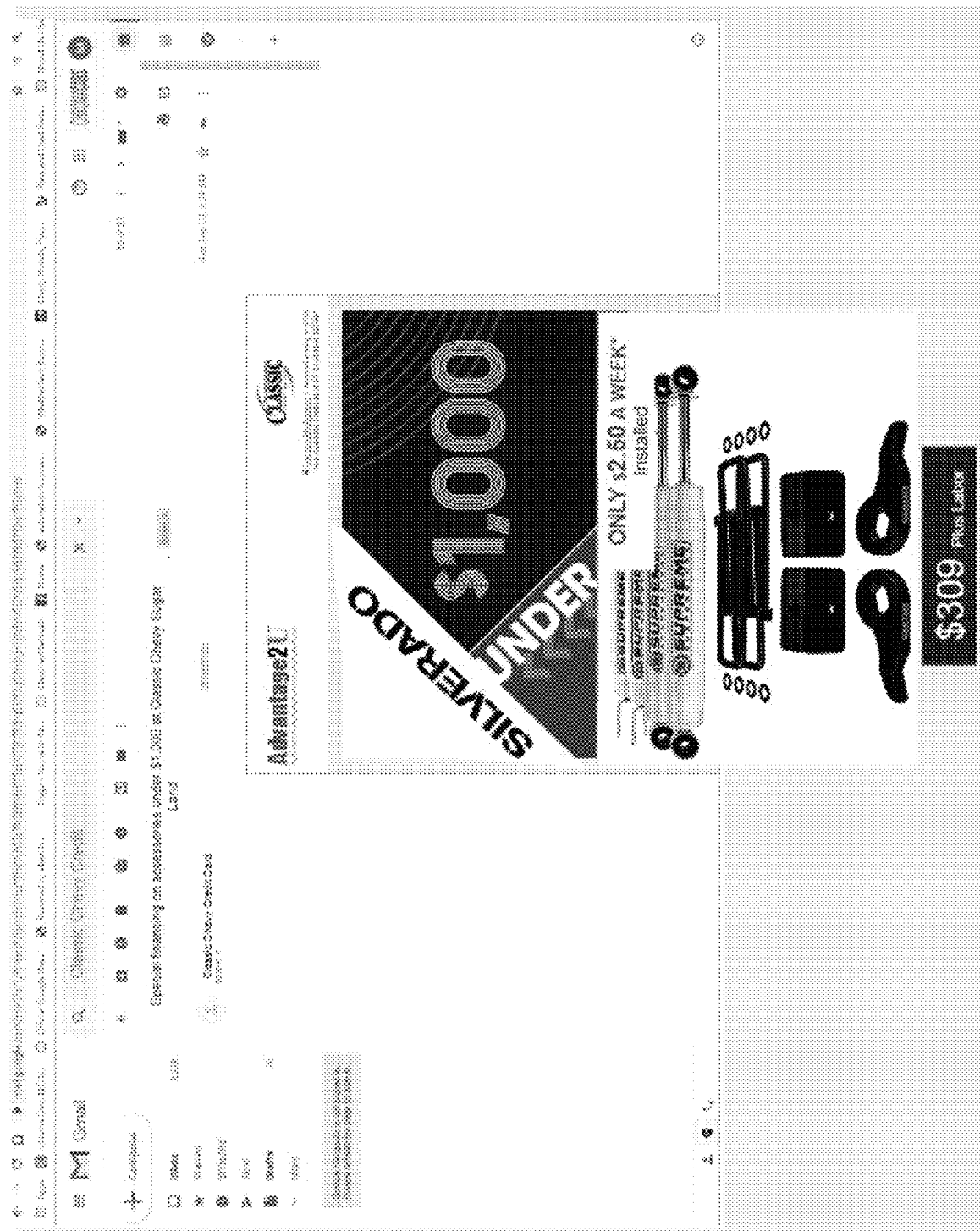

When a potential customer becomes an actual customer and signs up to make their auto loan payments using the Advantage2U® system, they are to log into the Advantage2U® system on a weekly basis to make said auto loan payments. The Advantage2U® system can be set so as to display service, parts, and accessory offerings to the customer as shown in FIG. 34, and these offerings may be priced on a weekly basis, further adding value for the customer. For example, a customer might desire to have certain aftermarket parts installed on their vehicle, but not want to pay the parts cost and installation up front. Instead, by purchasing through the Advantage2U® system, the customer has the opportunity to purchase those parts and labor by paying on a weekly basis, making it more easily affordable to the customer, and also having the benefit of increasing the auto dealer's revenue. A specific offer for aftermarket parts and installation to be paid on a weekly basis can be seen in FIGS. 37-38.

Figure 35:
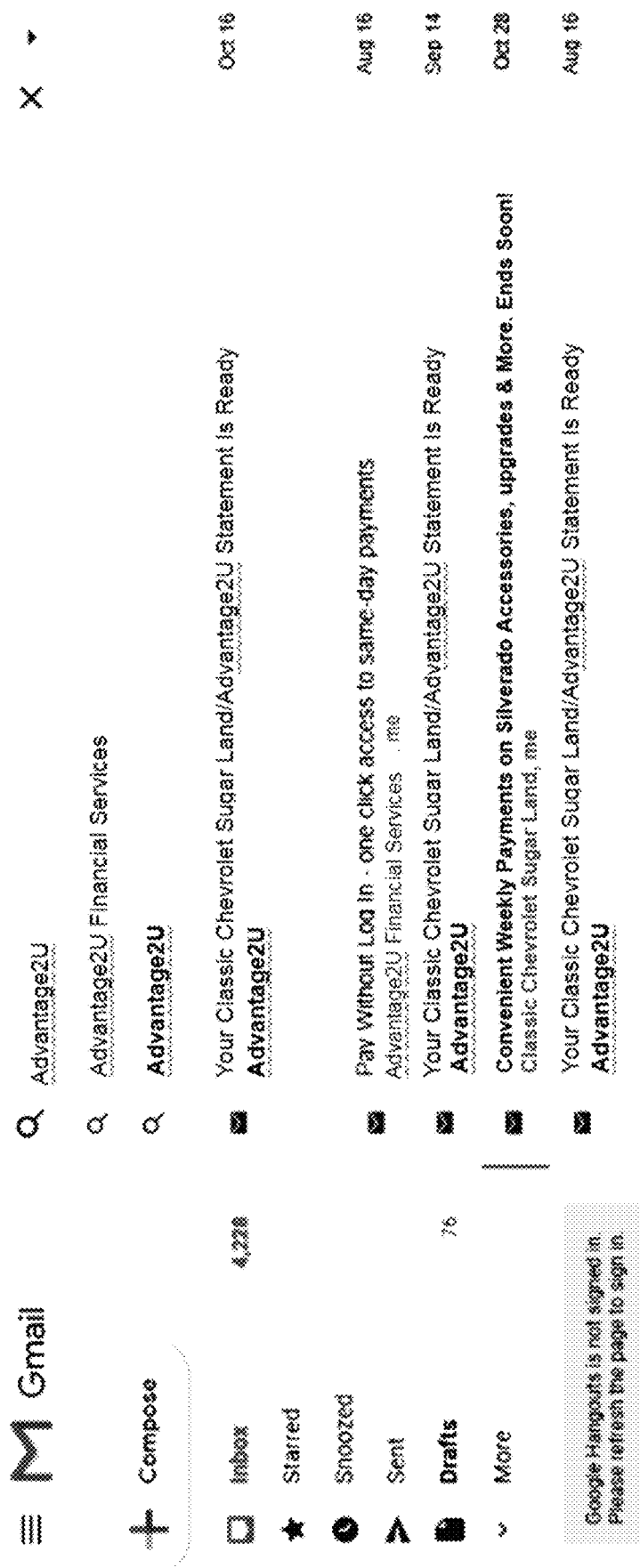
FIG. 35 is a sample e-mail inbox of a customer of the Advantage2U® system, showing how the system engages them on a weekly basis to facilitate making their payments, and also engages them to provide offers for parts and service.
Figure 36:
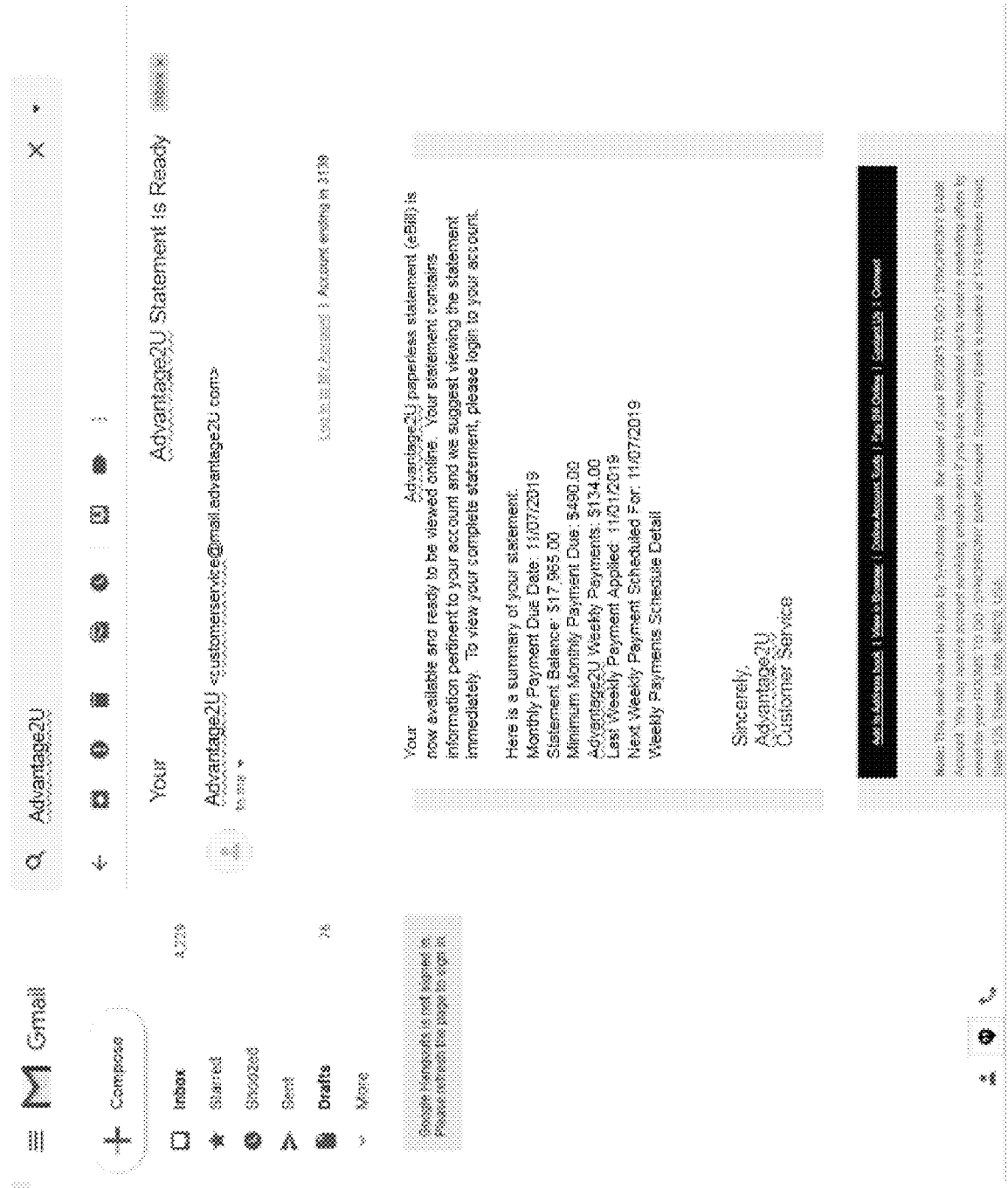
FIG. 36 is a sample statement e-mail sent by the Advantage2U® system to a customer thereof.

The Advantage2U® system can be set so as to send weekly e-mails to the customer, enabling them to quickly and easily click a link taking them into the system to make their payments, as displayed in FIG. 35. Sample content of these weekly e-mails can be seen in FIG. 36. Together with these weekly e-mails, the Advantage2U® system can be set to send promotional messages from the auto dealer from which the customer purchased their vehicle to the customer, enhancing communication by and between the customer and the auto dealer, as shown in FIG. 35.

The advantages provided by the Advantage2U® system are readily apparent from the above description. By enabling a customer to make easier to budget for weekly payments, saving those payments in escrow until the customer's monthly payment is due, and then paying the monthly payment together with additional principal, the Advantage2U® system greatly increases customer's purchasing power in a way that assists the customers with paying their auto loans off more quickly, build positive more quickly, pay off negative equity more quickly, builds credit, and allows the customer to purchase accessories and labor to install said accessories in an affordable fashion. Conventional payment portals employed by banks simply collect a monthly payment, depriving the customer of these advantages.

The Advantage2U® system has been described above as being engaged at the inception of a customer's loan, but this need not be the case. Indeed, the Advantage2U® system may be engaged by potential customers who already have an auto loan, and desire a better option for paying off their loan. Still further, the Advantage2U® system may be incorporated within and engaged within dealer websites that utilize the Max Allowance® system.

The Advantage2U® system has been described with reference to auto loans, but need not be so limited. In fact, the Advantage2U® system can be used with any sort of loan, for example, an auto lease, a mortgage, a student loan, a credit card, a personal loan, or a loan for any item listed above for which the Max Allowance® system may be used.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A server facilitating payments from a customer to a financing institution of the customer at which the customer has a loan account for which payments of a given amount are due on a monthly basis, with the payments of the given amount due on a monthly basis including an expected amount toward a principal balance of the loan and an expected amount toward loan interest, wherein the server comprises:

a communications interface configured to perform data communication;

a memory storing instructions; and
a microprocessor executing the instructions stored in memory, and cooperating with the communications interface to facilitate data communication regarding transactions between a computing device of the customer, a banking institution of the customer at which the customer possesses an account, and the financing institution over the Internet;
wherein, by executing the instructions stored in the memory, the microprocessor is configured to:
receive, through the communications interface, over the internet, instructions from the customer to enroll the customer with the server to facilitate weekly and monthly transfers;
once per week, initiate a transfer from the customer's account at the banking institution to an escrow service associated with the server, the initiated transfer being designated to be paid to the customer's loan account;
once per month, initiate a transfer from the escrow service to the financing institution to thereby make a payment to the customer's loan account;
wherein the weekly transfer from the customer's account at the banking institution to the escrow service is equal to the given amount due on a monthly basis, divided by four, resulting in a total amount of the customer's funds transferred to the escrow service each month from the weekly transfers and designated to be paid to the customer's loan account being greater than the given amount due on a monthly basis; and
wherein the payment made to the customer's loan account on a monthly basis is in an amount equal to the total amount of the customer's funds held in escrow designated to be paid to the customer's loan account, this amount of the payment made to the customer's loan account being such that the payment made to the customer's loan account includes the expected amount toward the principal balance of the loan, the expected amount toward the loan interest, and an additional amount toward the principal balance of the loan, in turn lowering the principal balance of the loan by a sum of the expected amount toward the principal balance of the loan and the additional amount toward the principal balance of the loan to thereby reduce the principal balance of the loan below an expected amortized principal balance at a current point in a term of the loan;
wherein, by executing the instructions stored in the memory, the microprocessor may be further configured such that the weekly transfer from the customer's account at the banking institution to the escrow service further includes an extra amount designated by the customer such that part of the extra amount designated by the customer is designated to be added to the additional amount toward the principal balance of the loan, and such that a remainder of the extra amount designated by the customer is designated to be added to a payment made to an automobile parts and service vendor in exchange for automobile parts and services provided to the customer.

2. The server of claim 1, wherein the loan account is of the customer is a pre-existing loan account.

3. The server of claim 2, wherein the pre-existing loan account is a pre-existing vehicle loan account.

4. The server of claim 1, wherein the loan account of the customer is a new loan account for an item newly purchased by the customer.

5. The server of claim 4, wherein the new loan account is for a vehicle newly purchased by the customer.

6. A server, comprising:
a communications interface configured to perform data communication;
a memory storing instructions;
a microprocessor executing the instructions stored in memory, and cooperating with the communications interface to facilitate data communication with a user's computing device over the Internet, wherein, by executing the instructions stored in the memory, the microprocessor is configured to:
cause the user's device to prompt the user for a desired monthly loan payment, a desired loan term, a desired down payment, and an estimated credit score of the user;
cause the user's device to display to the user a total financed amount the user can finance given the desired monthly loan payment, the desired loan term, the desired down payment, and the estimated credit score of the user, wherein the desired monthly loan payment includes an expected amount toward a principal balance of the loan and an expected amount toward loan interest, the principal balance of the loan being a remaining portion of the financed amount; and
cause the user's device to display to the user how long the financed amount would take to be paid off if the user were to enroll the user with the server to facilitate transfers, and then:
once per week, permit initiation of a transfer from an account of the user at a banking institution to an escrow service associated with the server; and
once per month, permit initiation of a transfer from the escrow service to a financing institution to thereby make a payment toward the financed amount;
wherein the weekly transfer to the escrow service is at least equal to the desired monthly loan payment, divided by four; and
wherein the monthly transfer to the financing institution is an amount equal to a total amount of the user's funds that would be held in escrow and are designated to be paid to the financed amount, resulting in a total amount transferred to the escrow service each month from the weekly transfers being greater than the desired monthly loan payment such that the payment made toward the financed amount includes the expected amount toward the principal balance of the loan, the expected amount toward the loan interest, and an additional amount toward the principal balance of the loan, in turn lowering the principal balance of the loan by a sum of the expected amount toward the principal balance of the loan and the additional amount toward the principal balance of the loan to thereby reduce the principal balance of the loan below an expected amortized principal balance;
wherein, by executing the instructions stored in the memory, the microprocessor may be further configured such that the weekly transfer from the user's account at the banking institution to the escrow service further includes an extra amount designated by the user such that part of the extra amount designated by the user is designated to be added to the additional amount toward the principal balance of the loan, and such that a remainder of the extra amount designated by the user is designated to be added to a payment made to an automobile parts and service vendor in exchange for automobile parts and services provided to the user.

7. A computer implemented method of facilitating payments from a customer to a financing institution of the customer at which the customer has a loan account for which payments of a given amount are due on a monthly basis, with the payments of the given amount due on a monthly basis including an expected amount toward a principal balance of the loan and an expected amount toward loan interest, the method comprising:
receive, through a communications interface, over the internet, instructions from the customer to enroll the customer to facilitate weekly and monthly transfers;
once per week, initiating a transfer from the customer's account at a banking institution to an escrow service;
once per month, initiating a transfer from the escrow service to the financing institution to thereby make a payment to the customer's loan account;
wherein the weekly transfer from the customer's account at the banking institution to the escrow service is at least equal to the given amount due on a monthly basis, divided by four; and
wherein the payment made to the customer's loan account on a monthly basis is in an amount equal to a total amount of the customer's funds held in escrow designated to be paid to the customer's loan account, this amount of the payment made to the customer's loan account being such that the payment made to the customer's loan account includes the expected amount toward the principal balance of the loan, the expected amount toward the loan interest, and an additional amount toward the principal balance of the loan, in turn lowering the principal balance of the loan by a sum of the expected amount toward the principal balance of the loan and the additional amount toward the principal balance of the loan to thereby reduce the principal balance of the loan below an expected amortized principal balance at a current point in a term of the loan;
wherein the payment made to the customer's loan account on a monthly loan account may further include an extra amount designated by the customer to be added to a payment made to an automobile parts and service vendor in exchange for automobile parts and services provided to the customer.

8. The method of claim 7, wherein the loan account is of the customer is a pre-existing loan account.

9. The method of claim 8, wherein the pre-existing loan account is a pre-existing vehicle loan account.

10. The method of claim 7, wherein the loan account of the customer is a new loan account for an item newly purchased by the customer.

\* \* \* \* \*